(12) United States Patent
Suga et al.

(10) Patent No.: US 6,557,919 B2
(45) Date of Patent: May 6, 2003

(54) ROTATING VEHICLE SEAT

(75) Inventors: Yasuo Suga, Kariya (JP); Masamitsu Iwatani, Kariya (JP); Takafumi Hijikata, Kariya (JP); Tadashi Takenoshita, Kokubu (JP); Yoshiyuki Miura, Kariya (JP); Mineki Tanaka, Kariya (JP)

(73) Assignee: Toyota Shatai Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/788,884

(22) Filed: Feb. 20, 2001

(65) Prior Publication Data
US 2001/0038223 A1 Nov. 8, 2001

Related U.S. Application Data

(63) Continuation of application No. 09/402,377, filed on Feb. 22, 2000, now abandoned.

(30) Foreign Application Priority Data

Apr. 3, 1997 (JP) .............................................. 9-085352
Sep. 2, 1997 (JP) .............................................. 9-237211
Apr. 3, 1998 (WO) ................................ PCT/JP98/01570

(51) Int. Cl.[7] .................................................. B60N 2/02
(52) U.S. Cl. ................................ 296/65.07; 296/65.12; 297/344.21
(58) Field of Search ........................... 296/65.11, 65.12, 296/65.06, 65.07, 65.01; 248/425; 297/344.21, 344.22, 344.24, 344.11, 344.03

(56) References Cited

U.S. PATENT DOCUMENTS 2,290,464 A 7/1942 Buchheit
2,587,679 A 3/1952 Atkinson
2,822,858 A * 2/1958 Mussler (List continued on next page.)

FOREIGN PATENT DOCUMENTS

DE 2655916 C2 7/1977
EP 0 656 277 A1 6/1995
FR 2 495 451 12/1980

(List continued on next page.)

OTHER PUBLICATIONS

Office Action issued from the Australian Patent Office dated Dec. 24, 1999.
International Search Report (PCT/JP98/03872) dated Oct. 15, 1998.

(List continued on next page.)

*Primary Examiner*—Joseph D. Pape
(74) *Attorney, Agent, or Firm*—Patterson Thuente Skaar & Christensen, P.A.

(57) ABSTRACT

With respect to a rotating seat for a vehicle, for example, for the elderly or the handicapped, the known art requires two operations of moving a seat body forward and rotating it to a door opening, and is thus poor in usability. Further, if the seat is positioned to the front such that the seat can be rotated at that position, the space close to occupant's feet is sacrificed. It is, accordingly, an object of the present invention to provide a rotating vehicle seat having excellent usability without sacrificing the space close to occupant's feet. A rotating vehicle seat of the present invention includes a rotating support base 10 for rotatably supporting a seat body 2, a longitudinal support base for supporting and moving the rotating support base in a longitudinal direction of a vehicle, and a coupling arrangement means 6, 38 disposed between the seat body 2 and the longitudinal support base for coupling the rotational movement and the longitudinal movement of the seat body.

63 Claims, 18 Drawing Sheets

U.S. PATENT DOCUMENTS

| | | | |
|---|---|---|---|
| 4,483,653 A | | 11/1984 | Waite |
| 4,733,903 A | * | 3/1988 | Bailey |
| 4,989,888 A | | 2/1991 | Qureshi et al. |
| 5,094,420 A | | 3/1992 | Aihara et al. |
| 5,149,113 A | | 9/1992 | Alldredge |
| 5,466,111 A | | 11/1995 | Meyer |
| 5,524,952 A | | 6/1996 | Czech et al. |
| 5,636,884 A | | 6/1997 | Ladetto et al. |
| 5,651,576 A | * | 7/1997 | Wallace .................. 296/65.11 |
| 5,720,462 A | | 2/1998 | Brodersen |
| 5,769,480 A | | 6/1998 | Gebhardt |
| 5,890,764 A | | 4/1999 | Lee |
| 6,024,398 A | | 2/2000 | Horton et al. |

FOREIGN PATENT DOCUMENTS

| | | | |
|---|---|---|---|
| JP | 53-19954 | | 2/1978 |
| JP | 57-22922 | * | 7/1980 |
| JP | 57-22925 | * | 7/1980 |
| JP | 57-22922 | | 2/1982 |
| JP | 57-22925 | | 2/1982 |
| JP | 58-164825 | | 11/1983 |
| JP | 60-92752 | | 5/1985 |
| JP | 62-43330 | * | 2/1987 |
| JP | 62-76036 | | 5/1987 |
| JP | 62-173343 | | 7/1987 |
| JP | 62-283027 | | 12/1987 |
| JP | 62-295660 | | 12/1987 |
| JP | 63-176752 | | 7/1988 |
| JP | 1-127852 | * | 8/1989 |
| JP | 1-266031 | | 10/1989 |
| JP | 3-71932 | * | 7/1991 |
| JP | 5-5551 | | 1/1993 |
| JP | 5-28740 | | 4/1993 |
| JP | 5-40027 | | 5/1993 |
| JP | 5-56581 | | 7/1993 |
| JP | 5-305112 | | 11/1993 |
| JP | 58-164825 | * | 11/1993 |
| JP | 5-93966 | | 12/1993 |
| JP | 6-895 | | 1/1994 |
| JP | 6-27298 | | 4/1994 |
| JP | 6-63426 | | 9/1994 |
| JP | 6-262971 | | 9/1994 |
| JP | 7-4149 | | 1/1995 |
| JP | 9-86233 | * | 9/1995 |
| JP | 7-323767 | | 12/1995 |
| JP | 8-300988 | * | 11/1996 |
| JP | 9-48271 | | 2/1997 |
| JP | 9-86233 | | 3/1997 |
| JP | 9-183325 | * | 7/1997 |
| WO | WO 93/18318 | | 9/1993 |
| WO | WO 98/43849 | | 10/1998 |

OTHER PUBLICATIONS

European Search Report dated Dec. 27, 1999.

Translation of Office Action issued from Japanese Patent Office dated Mar. 28, 2000 for Application No. 10–288198.

Translation of Office Action issued from Japanese Patent Office dated Mar. 28, 2000 for Application No. 10–298789.

Translation of Office Action issued from Japanese Patent Office dated Mar. 28, 2000 for Application No. 11–115074.

* cited by examiner

ROTATING VEHICLE SEAT

This is a continuation of Ser. No. 09/402,377, filed Feb. 22, 2000, abandoned.

FIELD OF THE INVENTION

The present invention relates to a rotating vehicle seat that is designed so that passengers, such as the elderly or the handicapped, can easily get in or out of a vehicle.

BACKGROUND OF THE INVENTION

A rotating seat of this type has been constructed to be rotated to the side of a door opening with an occupant held in a seated position (as disclosed, for example, in Japanese Laid-Open Utility Model Publication No. 61-57047 and Japanese Laid-Open Patent Publication No. 62-173343). The rotating vehicle seat is typically disposed as far to the rear as possible in order to provide a wide space close to the occupant's feet. Therefore, the seats in the front and the rear, for example in a four-door sedan car, are disposed such that the seats are masked beside the center pillars and the rear pillars.

Therefore, if the seat is rotated while in the initial seated position, the pillar that is positioned beside the seat interferes with the rotation of the seat to the entry/exit position. Therefore, with the known rotating seat, the rotating seat is first moved forward in order to be moved outside of the range of interference with the pillar. Thereafter, the seat is rotated to the door opening side.

DISCLOSURE OF THE INVENTION

Thus, the known rotating seat is poor in usability because it requires troublesome operations of moving the rotating seat forward and then rotating it to the side of the door opening. Further, if the seat is positioned near the front, such that the seat can be rotated while in the seated position, the space close to occupant's feet will be sacrificed and the occupant will be forced to sit in an uncomfortable position.

The present invention has been made in view of the above problems, and its object is to provide a rotating vehicle seat having excellent usability without sacrificing the space close to the occupant's feet.

To this end, the invention according to claim I provides a rotating vehicle seat that includes a rotating support base for rotatably supporting a seat body, a longitudinal support base for supporting and moving the rotating support base in a longitudinal direction of the vehicle, and coupling means disposed between the seat body and the longitudinal support base for coupling the rotational movement and the longitudinal movement of the seat body.

According to this rotating vehicle seat, when the seat body is rotated to the door opening side by means of the rotating support base, the seat body moves forward while rotating by means of the longitudinal support base that is coupled to the rotating support base by the coupling means. Therefore, even if the seat body is located in the rearmost position in order to provide a wide space close to the occupant's feet, by a simple rotational operation, the seat body can be rotated to the door opening side without interfering with a pillar or other portions of the vehicle. In other words, unlike the known rotating seat, it is not necessary to perform two operations of rotating the seat body and moving the seat body forward. Consequently, with the rotating vehicle seat according to claim 1 of the invention, it is possible to greatly improve usability while providing a wider space close to the occupant's feet.

The invention according to claim 2 provides the rotating vehicle seat as defined in claim 1, wherein the coupling means comprises a pinion gear that rotates together with the seat body, and a rack mounted on the longitudinal support base along the longitudinal direction thereof for engaging with the pinion gear.

According to this rotating vehicle seat, the rotational movement and the longitudinal movement of the seat body are coupled to each other by engaging the pinion gear on the seat body with the rack on the longitudinal support base. Therefore, the same effect as the construction of claim 1 can be obtained.

The invention according to claim 3 provides the rotating vehicle seat as defined in claim 1, wherein the coupling means comprises a pinion gear that rotates together with the seat body, an intermediate gear rotatably mounted on the rotating support base, and a rack mounted on the longitudinal support base along the longitudinal direction thereof, the pinion gear engaging with a small gear portion of the intermediate gear and the rack engaging with a large gear portion of the intermediate gear, whereby the rotational movement of the seat body is amplified by a ratio corresponding to a gear ratio of the large gear portion to the small gear portion and is transmitted to the longitudinal movement of the seat body.

According to this rotating vehicle seat, because the rotational movement of the seat body is amplified by a ratio corresponding to the gear ratio of the large gear portion to the small gear portion of the intermediate gear and is transmitted to the longitudinal movement of the seat body, the distance of the longitudinal movement of the seat body can be longer compared with a construction in which the pinion gear is directly engaged with the rack. The distance of the longitudinal movement, which can be coupled during the same 90° rotational movement of the seat body, can be set to a desired distance by changing the gear ratio of the small gear portion to the large gear portion of the intermediate gear. Thus, when applying this design to various types of vehicle, the rotating seat can provide the necessary amount of movement in the longitudinal direction to ensure a sufficient space close to the occupant's feet, so that the general versatility of the coupling means and the rotating seat can be enhanced.

The invention according to claim 4 provides the rotating vehicle seat as defined in claim 2 or 3, wherein the pinion gear has a non-toothed portion so that a range is provided in which the longitudinal movement is not coupled to the rotational movement of the seat body, which range is provided within the total range of rotational movement of the seat body.

According to this rotating vehicle seat, because a predetermined range in which the longitudinal movement is not coupled to the rotational movement of the seat body is provided within an initial range to start the seat body rotating from the seated position, the seat body does not move within this initial rotation range. After being rotated by a predetermined angle, the seat body can be moved forward by coupling with the rotational movement. By providing such a seat body that performs sophisticated movements, for example in a vehicle for which the occupant's feet will interfere with a front seat, a pillar, an opened door or other portions if the seat body is moved forward from the beginning of rotation, the seat body can be rotated only at the beginning, and after moving the occupant's feet to the outside of the door opening, the seat body can be moved forward. As a result, the seat body can rotate while preventing the occupant's feet as well as the seat body from interfering with a pillar or other portions.

The invention according to claim 5 provides the rotating vehicle seat as defined in claim 4, further comprising a slide lock mechanism for preventing the longitudinal movement of the seat body, the slide lock mechanism being constructed to be automatically released when the rotational movement and the longitudinal movement of the seat body are coupled to each other.

According to this rotating vehicle seat, the longitudinal movement of the seat body can be coupled to the rotational movement without the need to operate a commonly incorporated longitudinal slide lock mechanism. In this respect, usability can be further improved.

The invention according to claim 6 provides the rotating vehicle seat as defined in claim 1, wherein the coupling means comprises a link arm, one end of which is rotatably connected to the underside of the seat body at a position off center of the rotation of the seat body and the other end is rotatably connected to the longitudinal support base, whereby the first end of the link arm moves around the other end of the link arm and in the longitudinal direction of the vehicle as the seat body rotates, so that the seat body is moved in the longitudinal direction of the vehicle.

According to this rotating vehicle seat, because one end of the link arm moves around the center of rotation of the seat body when the seat body is rotated, while the other end of the link arm does not move, the seat body moves longitudinally with respect to the vehicle while rotating. Thus, the same effect as the construction of claim 1 can be obtained.

The invention according to claim 7 provides the rotating vehicle seat as defined in claim 1, wherein the coupling means comprises a wire, one end of which is secured to the underside of the seat body and the other end is secured to the longitudinal support base, whereby the seat body is moved in the longitudinal direction of the vehicle by winding the wire as the seat body rotates.

According to this rotating vehicle seat, when the wire is wound at the end thereof and shortened by the rotational movement of the seat body, the seat body moves, for example, frontward with respect to the vehicle. When the seat body is rotated in the reverse direction to release the winding, the wire is drawn out so that the seat body can be moved, for example, rearward with respect to the vehicle.

The invention according to claim 8 provides the rotating vehicle seat as defined in claim 1, further comprising a lateral support base for moving the seat body in a lateral direction of the vehicle, the lateral support base being constructed to move the seat body to a lower position as the seat body moves to the exterior in the lateral direction of the vehicle.

According to this rotating vehicle seat, because the seat body is displaced to a lower level than in the interior position when the seat body moves to the exterior of the door opening, the occupant can easily sit on and rise from the seat body. This is particularly useful when the occupant moves between a wheel chair and the seat body.

The invention according to claim 9 provides the rotating vehicle seat as defined in claim 8, further comprising a longitudinal restriction member for restricting the longitudinal movement of the seat body during the lateral movement of the seat body.

According to this rotating vehicle seat, the longitudinal movement of the seat body is restricted by the longitudinal restriction member during the lateral movement of the seat body. When the longitudinal movement is restricted, the coupled rotational movement is also restricted. Thus, the longitudinal movement and the rotational movement of the seat body are restricted when the seat body moves laterally of the vehicle, for example, from the interior to the exterior of the vehicle. Consequently, the seat body can be prevented from interfering with pillars on the both sides or other portions when passing through the door opening.

Various constructions may be applied as the longitudinal restriction member. For example, a restriction plate that serves as the longitudinal restriction member may be mounted on the lateral support base and configured to extend, for example, into the longitudinal moving range of the longitudinal support base throughout the entire lateral moving range of the seat body. With this construction, the longitudinal movement of the longitudinal support base can be prevented by interference of a portion of the longitudinal support base with the restriction plate.

The invention according to claim 10 provides the rotating vehicle seat as defined in claim 9, wherein the longitudinal restriction member also has a function of restricting the lateral movement of the seat body in the seated position.

According to this rotating vehicle seat, as the seat body moves to the exterior side by operation of the lateral support base, the seat body is gradually displaced to a lower position. Therefore, the seat body in the interior seated position will be displaced downward under its own weight unless restricted (i.e. natural drop). In order to restrict this natural drop, a brake-incorporated motor may be applied as a drive source for the lateral support base. The incorporated brake locking of the lateral support base can prevent the natural drop of the seat body.

Although the brake incorporated motor is larger in size and the cost is increased, with the construction according to claim 10, such a problem can be eliminated, because the lateral movement or natural drop of the seat body is prevented by the longitudinal restriction member, rather than by locking the motor as a drive source.

In order to restrict the lateral movement of the seat body in the seated position, the longitudinal restriction member may also be configured, for example, to extend into the lateral moving range of the longitudinal support base or the rotating support base or the seat body when the seat body is in the seated position.

BRIEF DESCRIPTION OF THE DRAWINGS

FIGS. 10(A) to 10(D) are plan views of the seat body, illustrating an operating procedure of the rotating vehicle seat, in which FIG. 10(A) shows a seated position, FIG. 10(B), a 40° rotated position, FIG. 10(C), a sideways position, and FIG. 10(D), a entry/exit position;

BEST MODES FOR PERFORMING THE INVENTION

Figure 1:
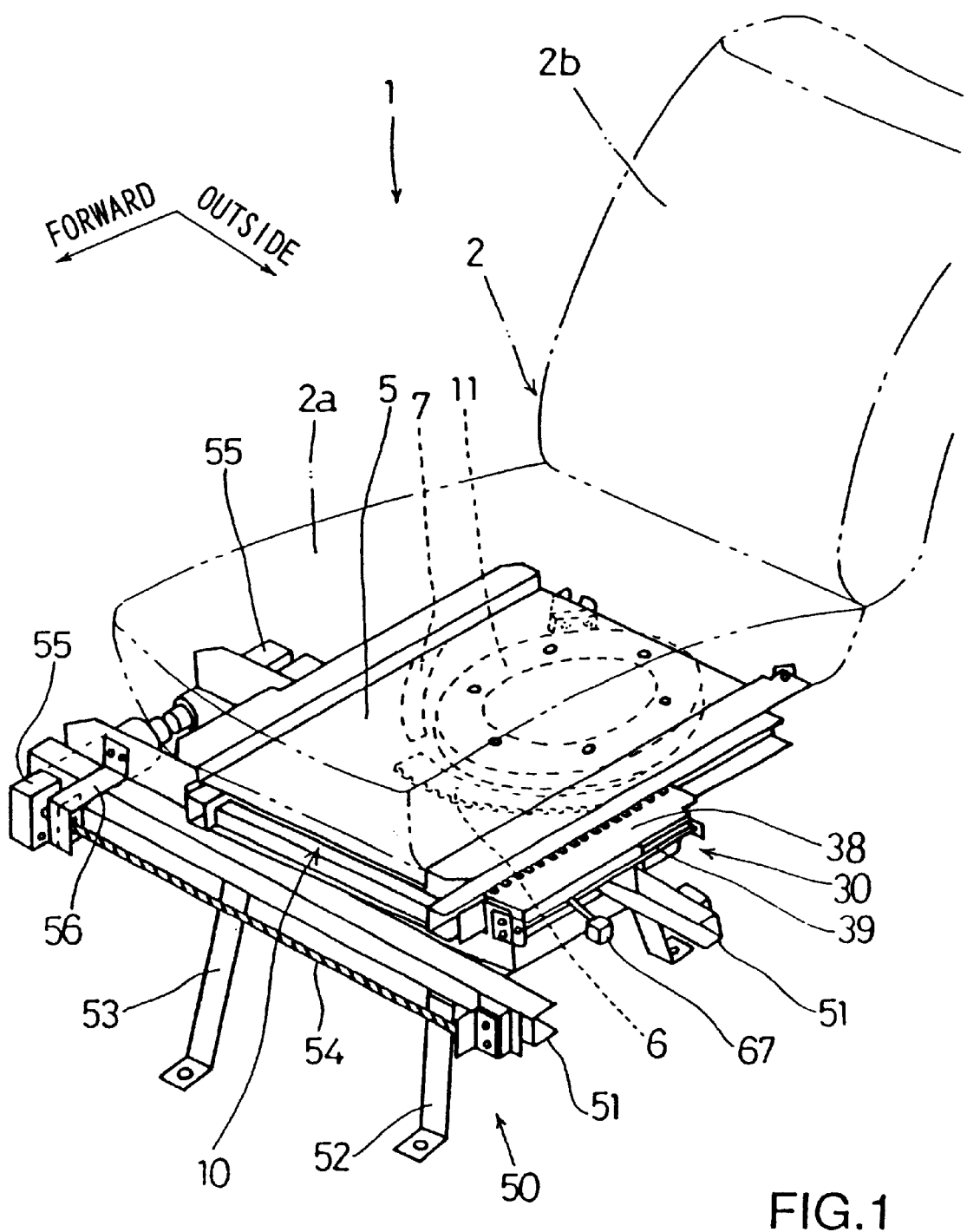
FIG. 1 is a perspective view of an entire rotating vehicle seat according to an embodiment of this invention.

A first embodiment of the present invention will now be explained with reference to FIGS. 1 to 11. FIG. 1 shows an entire rotating vehicle seat 1 according to this embodiment. The rotating seat 1 includes a seat body 2 (FIG. 2), a rotating support base 10 (FIG. 4) for rotatably supporting the seat body 2, a longitudinal support base 30 (FIG. 5) for moving the rotating support base 10 longitudinally with respect to the vehicle, and a lateral support base 50 (FIG. 6) for moving the longitudinal support base 30 laterally with respect to the vehicle. In FIGS. 1 to 6, the front of the vehicle is shown by arrow "forward", and the side having a door opening is shown by arrow "outside".

Figure 2:
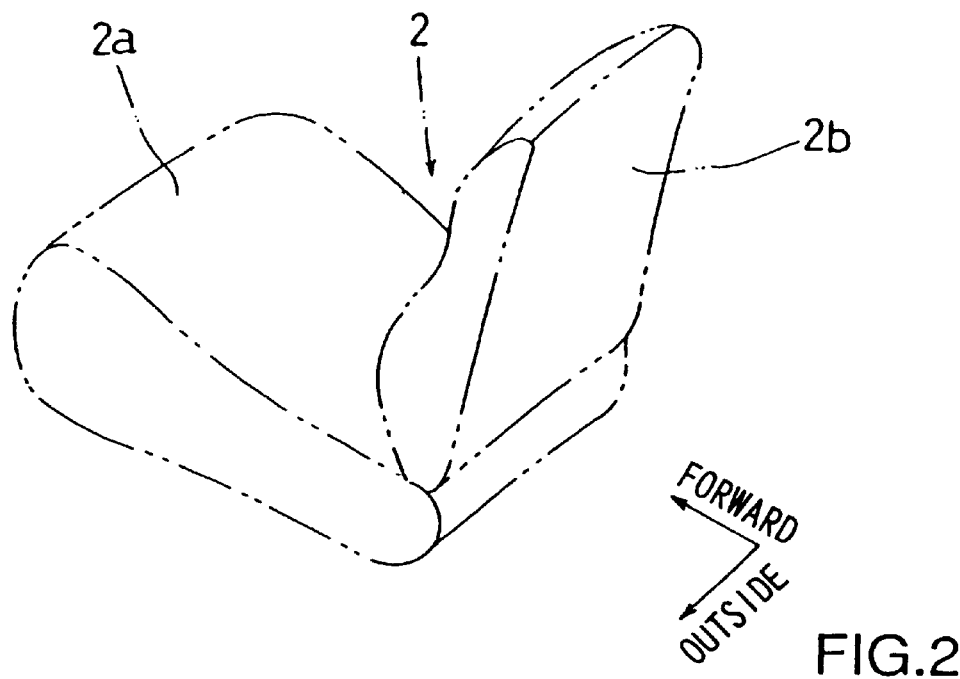
FIG. 2 is a perspective view of a seat body.
Figure 3:
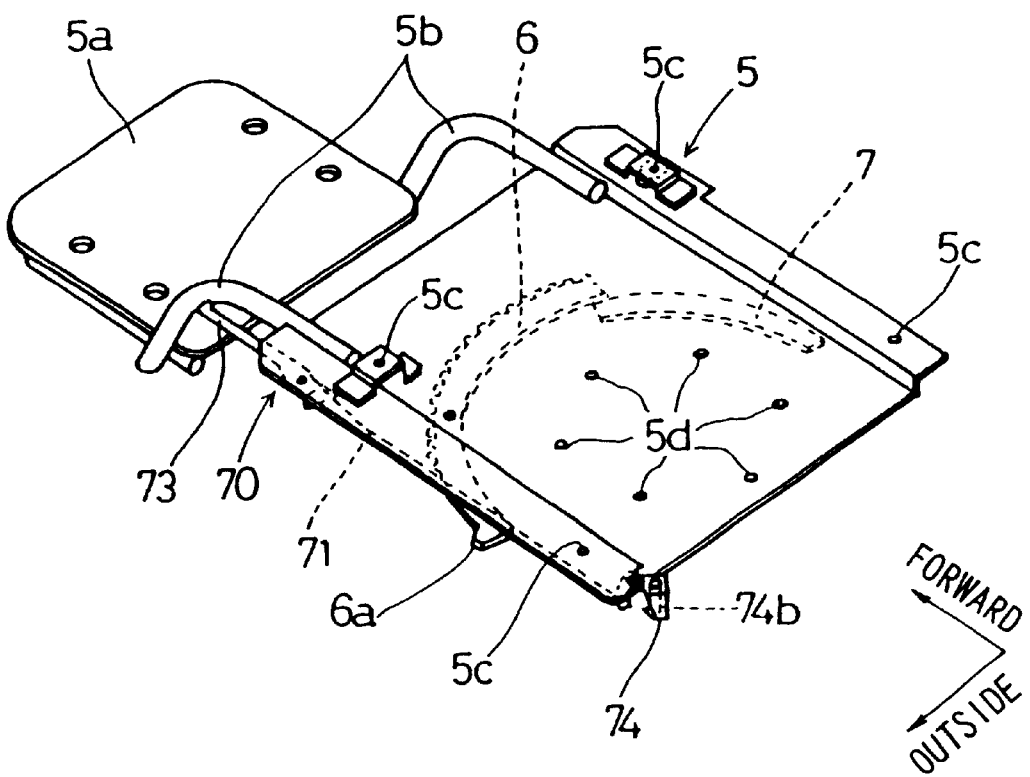
FIG. 3 is a perspective view of a seat base.

As shown in FIG. 2, the seat body 2 has a seat cushion 2a and a seat back 2b, which are of a known type and are not particularly modified for performing this invention. A seat base 5 is mounted to the underside of the seat cushion 2a. As shown in FIG. 3, a footrest 5a for resting the occupant's feet thereon is mounted to the front of the seat base 5 by support arms 5b.

A circular-arc pinion gear 6 and a circular-arc slide lock automatic release plate 7 are mounted to the underside of the seat base 5. The pinion gear 6 and a rack 38, which will be described later, form one of coupling means that is described in the appended claims. The slide lock automatic release plate 7 has a function of automatically releasing a slide lock mechanism 80, which will be described later. Further, the seat base 5 has a rotation lock release lever 73 disposed on the front left corner and a rotation lock member 74 disposed on the rear left corner. The rotation lock release lever 73 and the rotation lock member 74 form a rotation lock mechanism 70, which will be described later.

Further, four holes 5c formed on both sides of the seat base 5 serve as bolt insertion holes for securing the seat base 5 to the underside of the seat body 2. The seat base 5 also has six holes 5d formed in a circle and located to the rear in the midsection thereof to serve as bolt insertion holes for securing the seat base 5 to a rotating ring 11 of the rotating support base 110, which will be described below.

Figure 4:
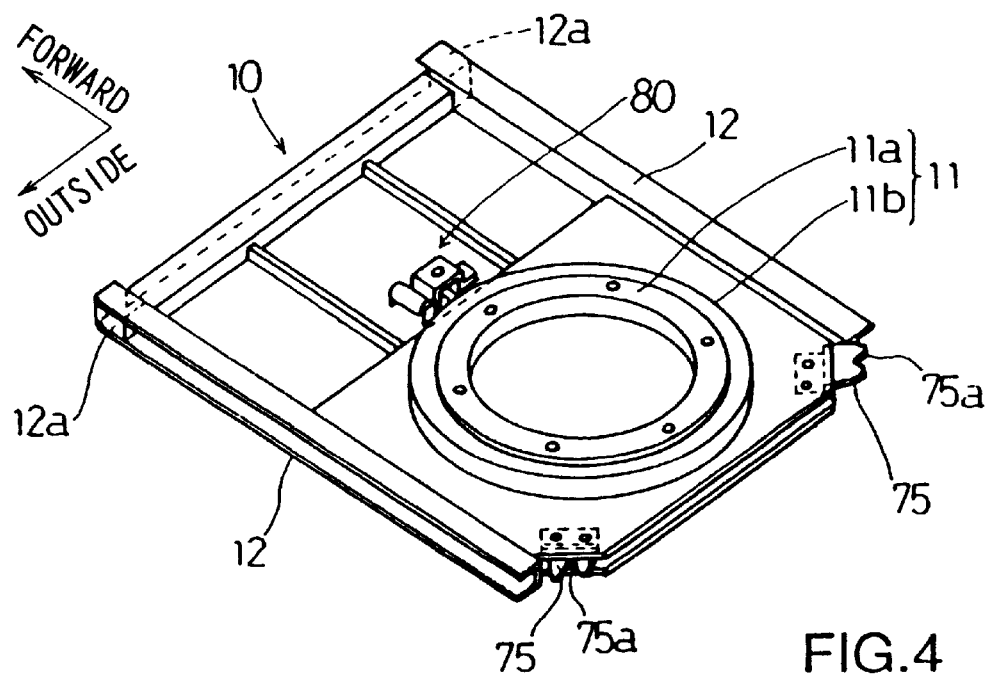
FIG. 4 is a perspective view of a rotating support base.

The seat base 5 having such a construction is rotatably supported on the topside of the rotating support 10 via the rotating ring 11. As shown in FIG. 4, the rotating ring 11 has an inner ring 11a and an outer ring 11b, and a plurality of steel balls (not shown) are disposed between the rings 11a and 11b. The inner ring 11a is secured to the underside of the seat base 5, and the outer ring 11b is secured to the topside of the rotating support base 10. Within the rotating ring 11, the inner ring 11a rotates with respect to the outer ring 11b while bearing the weight of the occupant and the seat body 2. As a result, the seat body 2 rotates with respect to the rotating support base 10.

A pair of slide rails 12 having a U-shaped cross-section are disposed parallel to each other on and along the longitudinal sides of the rotating support base 10. Further, a slide lock mechanism 80 is disposed generally in the center of the rotating support base 10, and rotation lock plates 75 are disposed on both rear corners to form a rotation lock mechanism 70. The slide lock mechanism 80 will be described later. Elastic rubber stoppers 12a, which will also be described later, are mounted on the front end of the slide rails 12.

The rotating support base 10 thus constructed is longitudinally movably supported by the longitudinal support base 30. The longitudinal support base 30 has a pair of parallel main frames 31 along a lateral direction of the vehicle, and a pair of support frames 32, one of which extends across the interior side ends of the main frames 31, and the other of which extends across the exterior side ends of the main frames 31 (which exterior side support frame 32 is not shown). A base 33 is mounted on the frame formed by the main frames 31 and the support frames 32.

The base 33 has bent edges 33a formed by bending the interior and exterior side edges thereof upwardly by a predetermined width. Each of the bent edges 33a has two vertical rollers 36 and two horizontal rollers 37 rotatably mounted on the interior surface of the associated bent edge 33a. The vertical rollers 36 rotate vertically around a horizontal axis and the horizontal rollers 37 rotate horizontally around a vertical axis. The vertical rollers 36 and the horizontal rollers 37 support the slide rails 12 of the rotating support base 10, thereby supporting the rotating support base 10 for movement in the longitudinal direction of the vehicle. The vertical rollers 36 also serve to prevent vertical rattling of the seat body 2 and the horizontal rollers 37 serve to prevent lateral rattling of the seat body 2, so that the rotating support base 10 rotates smoothly in the longitudinal direction of the vehicle.

A shaft 39 is pivotally supported across the exterior side ends of the main frames 31, and a plate-like rack 38 is mounted to the shaft 39. A slide lock manual release lever 67 is mounted on the middle of the shaft 39. When the slide lock manual release lever 67 is turned vertically, the shaft 39 rotates and thus the rack 38 rotates vertically around the rear edge thereof. The rack 38 is held horizontal when the slide lock manual release lever 67 is not operated. At this time, the rack 38 can engage the pinion gear 6 mounted on the underside of the seat base 5. On the other hand, when the lever 67 is turned downwardly to cause the rack 38 to rotate upwardly, the rack 38 is displaced upwardly with respect to the pinion gear 6, so that the rack 38 and the pinion gear 6 cannot engage each other.

Figure 9:
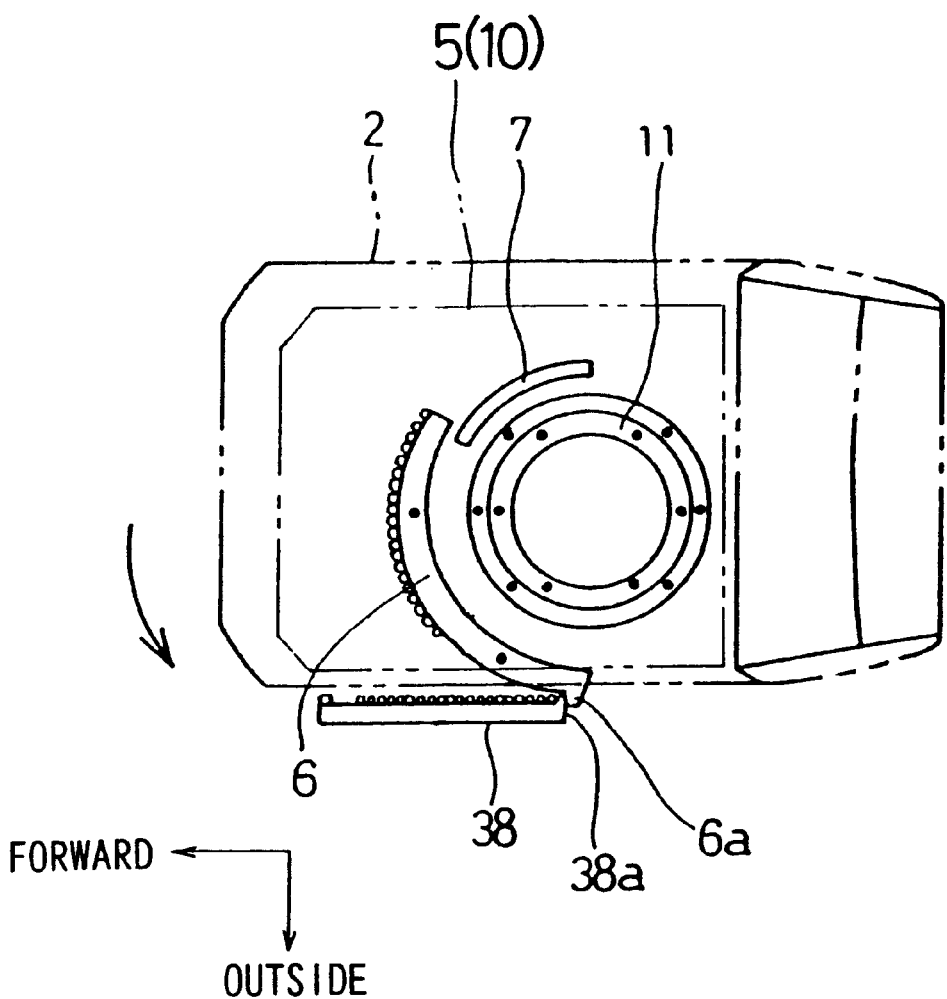
FIG. 9 is a plan view showing the positional relationship of a pinion gear, a rack, a rotation lock automatic release plate and a rotating ring.

As shown in FIGS. 3 and 9, the pinion gear 6 has a circular-arc shape extending in a range of about 90° and no engagement teeth are not provided within a predetermined angular range (about 40° in this embodiment) on the initial engagement side (the counterclockwise end side). Therefore, the pinion gear 6 does not engage the rack 38 within the initial range of about 40° at the beginning of rotation, in which the seat body 2 is rotated from the initial seated position (as shown in FIG. 9 where the seat faces forward) to the door opening side as shown by an arrow in FIG. 9 (in the counterclockwise direction). Thus, the seat body 2 only rotates without moving forward (in the "non-coupling range"). When the seat body 2 is further rotated, the pinion gear 6 engages the rack 38, so that the seat body 2 rotates while moving forward (in the "coupling range").

The pinion gear 6 has a projection 6a formed on the end of the initial engagement side thereof, and the projection 6a abuts against the rear end 38a of the rack 38 when the seat body 2 is in the seated position. Thus, the seat body 2 in the seated position is stopped from rotating to the direction opposite to the door opening side (clockwise in FIG. 9), and the seat body 2 is prevented from rattling in this seated position.

Figure 5:
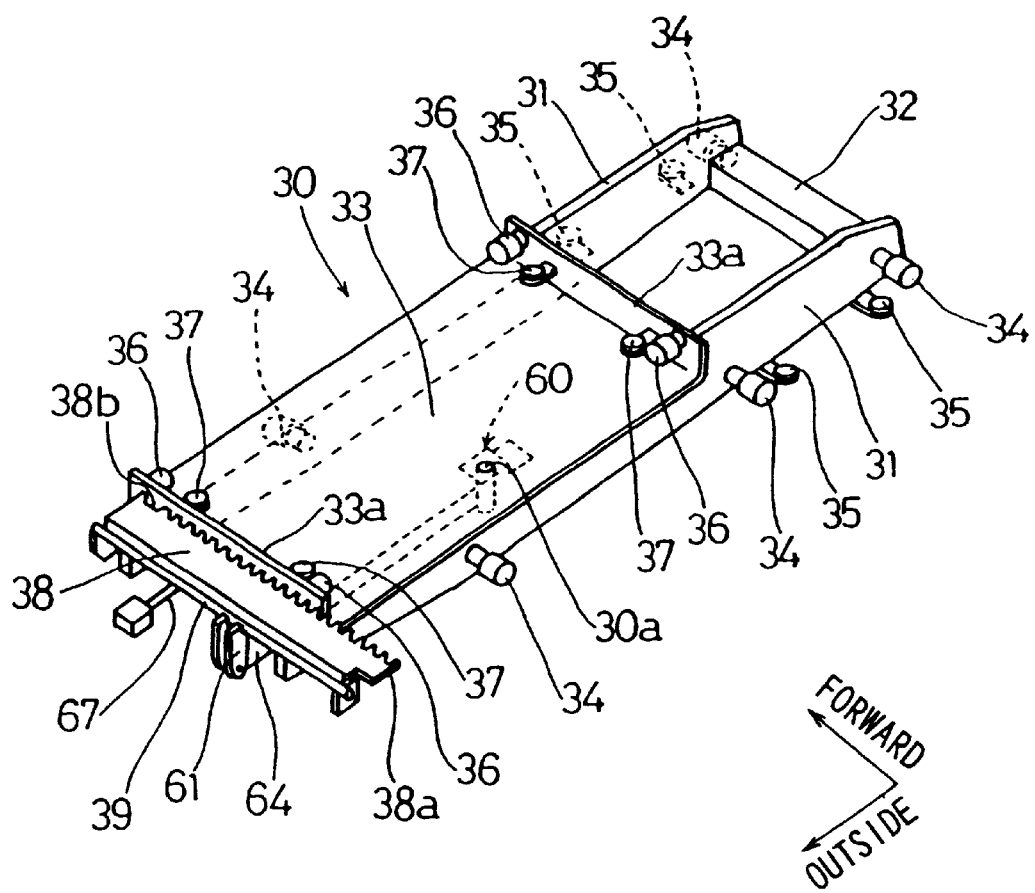
FIG. 5 is a perspective view of a longitudinal support base.

As shown in FIG. 5, a link arm 61, as well as the slide lock manual release lever 67, which together constitute a slide lock manual release mechanism 60, is secured to the shaft 39 at the end thereof. The slide lock manual release mechanism 60 is mounted on the underside of the base 33 and will be described later.

Three vertical rollers 34 and two horizontal rollers 35 are rotatably attached to the sides of the each main frame 31. The vertical rollers 34 and the horizontal rollers 35 are inserted for rolling movement into the interior of slide rails 51 of the lateral support base 50, which will be described below, so that the longitudinal support base 30 is supported for movement in the lateral direction of the vehicle.

Figure 6:
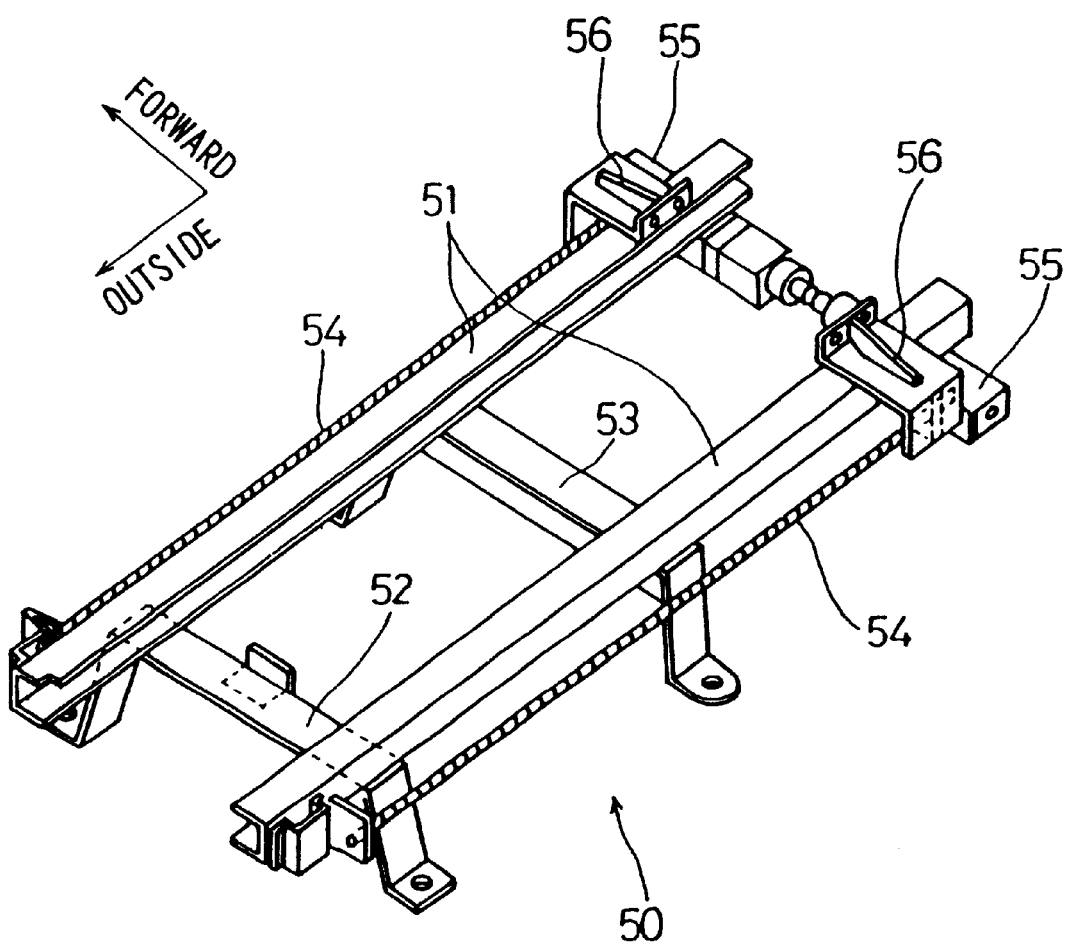
FIG. 6 is a perspective view of a lateral support base.

The lateral support base 50 has a pair of parallel slide rails 51 along the lateral direction of the vehicle. The slide rails 51 have a U-shaped cross-section as shown in FIG. 6 and support the vertical rollers 34 and the horizontal rollers 35 for rolling movement in the interior thereof as described above. The slide rails 51 are disposed on the vehicle floor by an exterior side bracket 52 and an interior side bracket 53. The interior side bracket 53 has legs longer than the exterior side bracket 52, so that the slide rails 51 are inclined downwardly from the interior side to the exterior side (the door opening side) of the vehicle (see FIG. 11).

A threaded shaft 54 is rotatably supported along and to the sides of the each slide rail 51, and the interior side end of the threaded shaft 54 is connected to the output shaft of an associated electric motor 55. A bracket 56 is mounted on the threaded shaft 54 by a threaded engaging nut (not shown). When the electric motors 55 rotate the same revolutions in the normal direction, the brackets 56 move to the exterior side (to the left in FIG. 6) at a certain speed, while, when the electric motors 55 rotate the same revolutions in the reverse direction, the brackets 56 move to the interior side (to the right in FIG. 6) at the same speed. The start and stop of the electric motors 55 are effected by an operation switch (not shown) disposed on an armrest portion of a door trim board.

Figure 11:
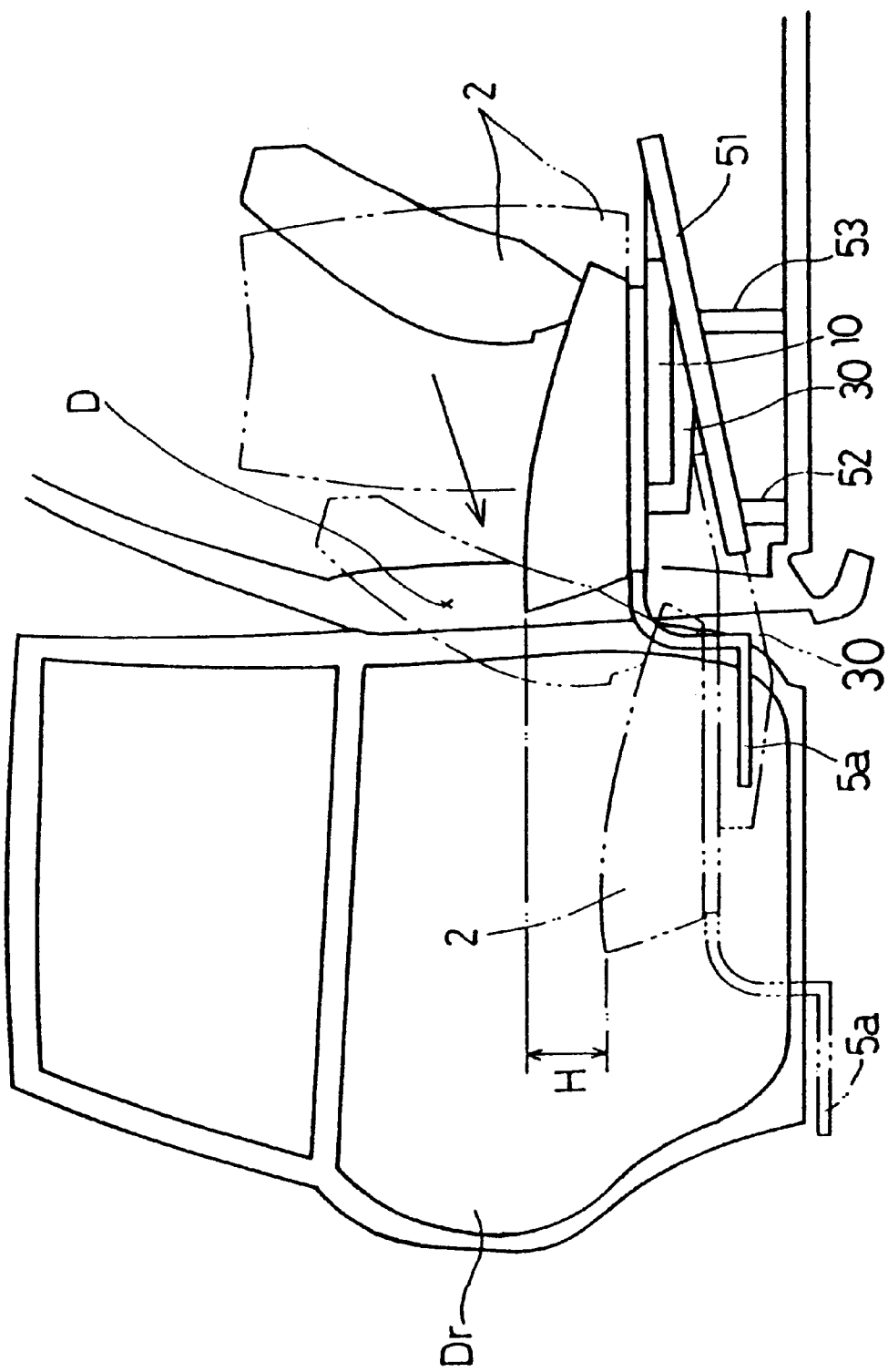
FIG. 11 is a side view of the seat body, illustrating its movement from the interior to the exterior of the vehicle.

The brackets 56 are secured to the main frames 31 of the longitudinal support base 30. Therefore, when the electric motors 55 rotate in the normal or reverse direction, the longitudinal support base 30 and thus the seat body 2 move in the lateral direction of the vehicle, so that the seat body 2 can be moved to the entry/exit position on the exterior of the vehicle via the door opening and can then be returned to the interior of the vehicle. Thus, unlike the rotating support base 10 and the longitudinal support base 30, the lateral support base 50 is electrically driven. Further, as described above, because the slide rails 51 of the lateral support base 50 are inclined downwardly from the interior side to the exterior side (the door opening side) of the vehicle, as shown in FIG. 11, the seat body 2 is gradually displaced to a lower position when moving to the exterior of the vehicle. The level of the seat when finally moved to the exterior entry/exit position is lower by dimension H than the level at the interior seated position. By thus setting the entry/exit position to a position lower than the level of the interior seated position, the passenger can more easily move between the seat body 2 and, for example, a wheel chair (which seat is normally lower than the level of the interior seated position).

The rotating seat 1 of this embodiment includes the rotation lock mechanism 70 for preventing rotation of the seat body 2, the slide lock mechanism 80 for preventing sliding movement in the longitudinal direction of the vehicle, and the slide lock manual release mechanism 60 for manually releasing the slide lock mechanism 80. First, the rotation lock mechanism 70 is shown in detail in FIG. 7. The rotation lock mechanism 70 mainly consists of the rotation lock release lever 73, the rotation lock member 74 and the rotation lock plates 75, which were described above. The rotation lock release lever 73 is mounted to the front left corner of the seat base 5 via a support pin 73a and is operated by turning laterally. The rear end of the rotation lock release lever 73 is connected to the end of an operating wire 71 via a keyhole-shaped catching slit 73b. The operating wire 71 is connected to the rear corner of the seat base 5 through the interior of a protective tube 72.

The rotation lock member 74 is disposed on the rear left corner of the seat base 5, as described above. The rotation lock member 74 is formed by bending the upper and lower edges of a plate into a generally U-shape, and has a lock pin 74b mounted across the bent edges. The rotation lock member 74 is mounted for horizontal rotation around a shaft 74b. A return spring, which is not shown, is disposed around the shaft 74a between the rotation lock member 74 and the seat base 5, so that the rotation lock member 74 is rotatably biased in the locking direction (the counterclockwise direction in FIG. 7). Further, the other end of the above-described operating wire 71 is connected to a keyhole-shaped catching slit 74c formed in the rotating end of the rotation lock member 74.

Figure 7:
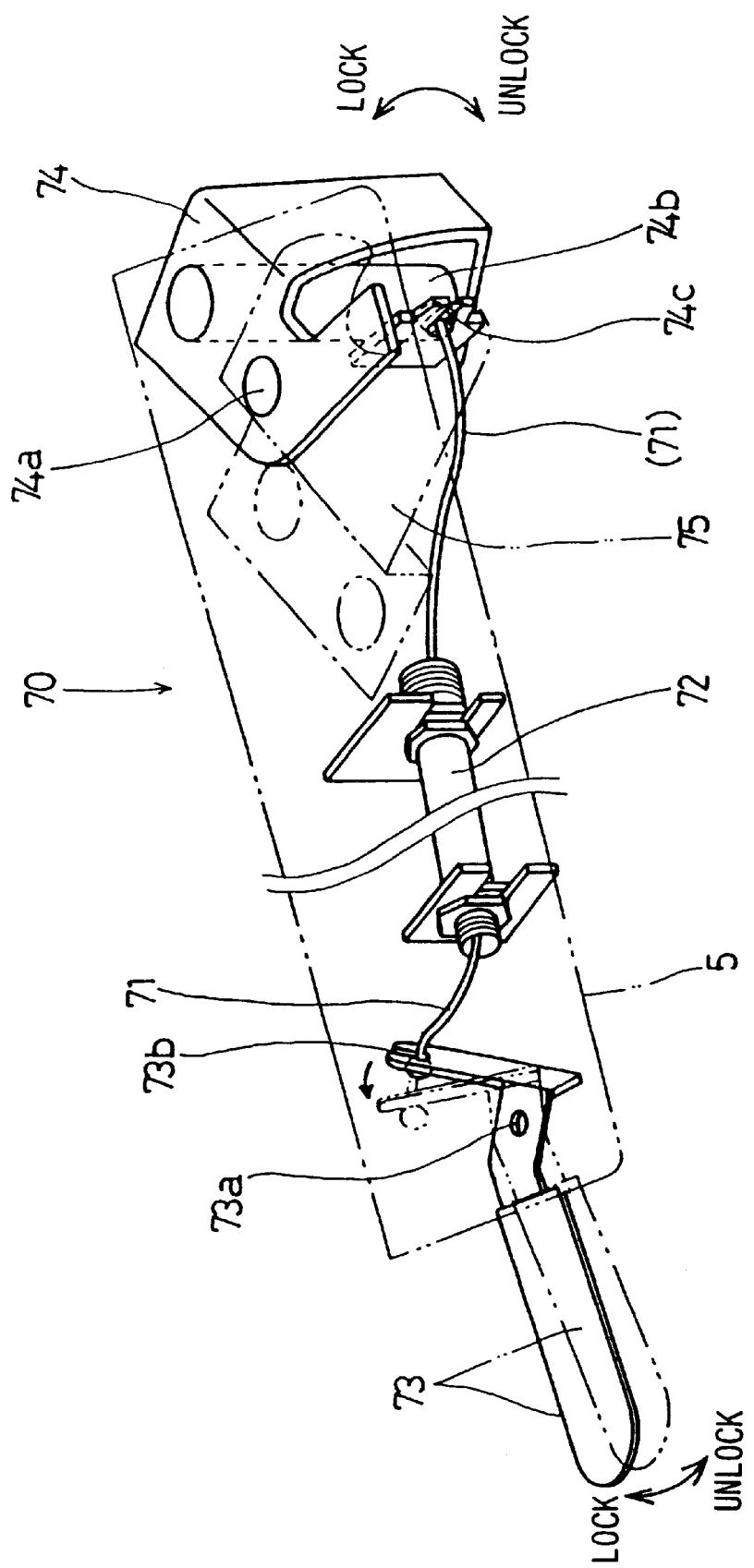
FIG. 7 is a perspective view of a rotation lock mechanism.

With the rotation lock mechanism 70 thus constructed, as shown by a phantom line in FIG. 7, when the rotation lock release lever 73 is turned against the return spring in the unlocking direction, the operating wire 71 moves to the left in the drawing and thus the rotation lock member 74 rotates around the shaft 74a in the unlocking direction (in the clockwise direction in the drawing). As a result, the lock pin 74b is disengaged from a recess 75a of the lock plate 75, so that the rotation lock is released. Once the rotation lock is released, the seat base 5 and thus the seat body 2 can rotate.

When the rotational operation of the rotation lock release lever 73 is released, the rotation lock member 74 is returned in the locking direction by the return spring, and thus the lock pin 74b is returned to the area within which the lock pin 74b can engage the lock plates 75. Therefore, when the seat body 2 is rotated to the seated position or the sideways position facing the door opening side, the lock pin 74b engages in the recess 75a of one of the rotation lock plates 75, so that the seat body 2 is prevented from rotating at that position. The rotation lock member 74 is disposed on the rear left corner of the seat base 5 as shown in FIG. 3, while the rotation lock plates 75 are disposed on both rear corners of the rotating support base 10. Thus, the lock member 74 is rocked by the left rotation lock plate 75 when the base body 2 is rotated to the seated position facing the front of the vehicle, while the lock member 74 is locked by the right rotation lock plate 75 when the base body 2 is rotated to the sideways position facing the door opening side.

In the seated position in which the seat body 2 faces to the front of the vehicle, the lock member 74 is locked by the left rotation lock plate 75 and the projection 6a of the pinion gear 6 abuts against the rear end 38a of the rack 38 as described above, so that rattling of the seat body 2 in the seated position can be prevented. Further, when rotation of the rotation lock release lever 73 to the unlocking side is stopped and the rotation lock member 74 rotates in the locking direction by the return spring, the operating wire 71 is pulled to the right in FIG. 7 and thus the rotation lock release lever 73 is returned in the locking direction.

Figure 8:
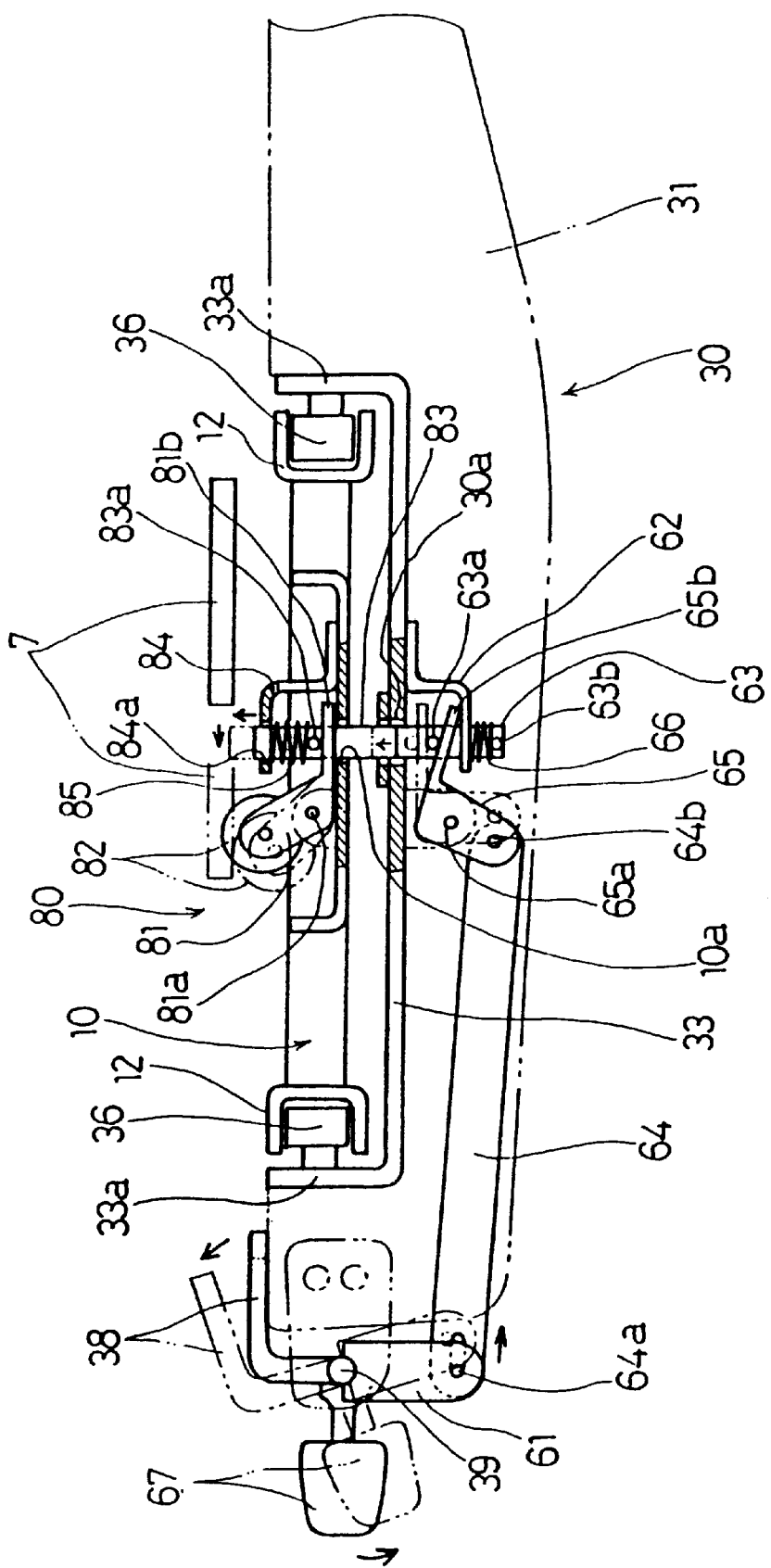
FIG. 8 is a side view of a slide lock mechanism and a slide lock manual release mechanism.

The slide lock mechanism 80 and the slide lock manual release mechanism 60 are shown in detail in FIG. 8. The slide lock mechanism 80 is disposed generally in the center of the rotating support base 10 (see FIG. 4) and is designed to hold the seat body 2 locked in the rearmost position (in which the space at the occupant's feet is the widest) of the range of longitudinal movement. The slide lock mechanism 80 has a pivotal bracket 81 which can pivot in the vertical direction around a shaft 81a, and a lock pin 83 which moves vertically by the movement of the pivotal bracket 81. A roller 82 is rotatably supported on one end of the pivotal bracket 81. Further, the other end 81b of the pivotal bracket 81 is located under an engagement pin 83a that extends radially outwardly from the lock pin 83. The lock pin 83 is supported for vertical movement by an insertion hole 10a formed in the rotating support base 10 and a support hole 84a of a support bracket 84 mounted on the top side of the rotating support base 10. A compression spring 85 is disposed between the support bracket 84 and the engagement pin 83a and biases the lock pin 83 downwardly.

The lower portion of the lock pin 83 extends through the insertion hole 10a to the underside of the rotating support base 10. When the lock pin 83 is moved downwardly by the action of the compression spring 85, the lower end of the lock pin 83 is inserted into a lock hole 30a formed in the base 33 of the longitudinal support base 30, so that the rotating support base 10 is locked against longitudinal movement with respect to the longitudinal support base 30 (i.e. "slide lock"). The lock pin 83 and the lock hole 30a are positioned such that in this locked condition, the seat body 2 is locked in the rearmost position in the longitudinal moving range.

On the other hand, when the lock pin 83 moves upward against the compression spring 85, the lower end of the lock pin 83 is disengaged from the lock hole 30a, so that the rotating support base 10 and thus the seat body 2 can move longitudinally with respect to the longitudinal support base 30 (i.e. "release of the slide lock"). The upward movement of the lock pin 83, i.e. release of the slide lock, is effected by the pivotal bracket 81 rotating counterclockwise in FIG. 8 (in the slide lock releasing direction) around the shaft 81a. The pivotal bracket 81 pivots in the slide lock releasing direction when the roller 82 is depressed by the slide lock automatic release plate 7 mounted on the underside of the seat base 5. Specifically, when the slide lock automatic release plate 7 moves to the roller 82 with rotation of the seat body 2 and the seat base 5, the release plate 7 depresses the roller 82 by a certain amount. As a result, the pivotal bracket 81 pivots in the slide lock releasing direction and thus the other end 81b of the pivotal bracket 81 pushes up the engagement pin 83a, so that the lock pin 83 moves upward against the compression spring 85.

The timing when the slide lock automatic release plate 7 depresses the roller 82 to release the slide lock is set to be immediately before the pinion gear 6 engages the rack 38 by rotation of the seat body 2. Therefore, within the initial range of about 40° at the beginning of rotation of the seat body 2 from the initial seated position, the slide lock automatic release plate 7 does not reach the upper side of the roller 82 and the lock pin 83 is inserted in the lock hole 30a, so that the seat body 2 is locked against movement in the longitudinal direction.

When the seat body 2 rotates by about 40°, the slide lock automatic release plate 7 depresses the roller 82, which allows the seat body 2 to move longitudinally (i.e. "automatic release of the slide lock"). Thereafter, the roller 82 is held depressed by the slide lock automatic release plate 7 until the seat body 2 reaches the sideways position facing the door opening side. Thus, the seat body 2 moves forward while rotating by engaging the pinion gear 6 with the rack 38.

On the other hand, before the seat body 2 has rotated by about 50° from the sideways position facing the door opening side toward the seated position, the roller 82 is held depressed by the slide lock automatic release plate 7, so that the slide lock is released. Thus, the seat body 2 moves rearward while rotating toward the seated position. When the seat body 2 rotates by about 50° from the sideways position to the seated position, the seat body 2 returns to the rearmost position, and at the same time, the slide lock automatic release plate 7 is disengaged from the roller 82 to release the depressed roller 82. As a result, the lock pin 83 moves downward by the compression spring 85 and the lower end of the lock pin 83 is inserted again into the lock hole 30a of the longitudinal support base 30. Thus, the seat body 2 is locked against longitudinal movement in the rearmost position. Thereafter, the seat body 2 only rotates about 40° to return to the seated position facing the front of the vehicle.

Thus, the automatic locking and unlocking of the lock mechanism 80 is timed to the coupling of the rotation and the longitudinal movement of the seat body 2. The slide lock automatic release plate 7 is configured to have an appropriate dimension and shape and is mounted in such a position that allows such locking and unlocking. Further, when the seat body 2 is locked in the rearmost position, not only the lock pin 83 is inserted into the lock hole 30a as described above, but the vertical rollers 36 on the forward portion of the longitudinal support base 30 are also resiliently pressed against the stoppers 12a. Thus, the rattling of the seat body 2 in the longitudinal direction in this locked state can be prevented.

The slide lock mechanism 80 thus constructed is designed to be manually releasable by means of the slide lock manual release mechanism 60, independent of the coupling timing of the two movements of the seat body 2. The slide lock manual release mechanism 60 includes the slide lock manual release lever 67 and a link arm 61 both mounted on the shaft 39, a connecting link 64 rotatably connected to the end of the link arm 61 via a shaft 64a, a pivotal arm 65 mounted on the underside of the base 33 of the longitudinal support base 30 for vertical rotation around a shaft 65a, and a lock release pin 63 that vertically moves by pivotal movement of the pivotal arm 65. One end of the pivotal arm 65 is rotatably connected to one end of the connecting link 64 via a shaft 64b. The lock release pin 63 is supported for vertical movement and co-axially with the lock pin 83 by the lock hole 30a and an insertion hole 62a of a support bracket 62 mounted on the underside of the base 33. The lock release pin 63 has an engagement pin 63a radially outwardly extending from generally the middle portion in the longitudinal direction thereof. The other end 65b of the pivotal arm 65 is located between the engagement pin 63a and the support bracket 62.

The lock release pin 63 further has a pin 63b radially outwardly extending from the lower portion thereof, and a compression spring 66 is disposed between the pin 63b and the support bracket 62 so that the lock release pin 63 is biased downwardly.

With the slide lock manual release mechanism 60 thus constructed, when the slide lock manual release lever 67 is not depressed (as shown by the solid line in FIG. 8); the lock release pin 63 is biased downwardly and thus the upper surface of the lock release pin 63 is located deep within the lock hole 30a. Accordingly, the lock pin 83 is inserted into the lock hole 30a, so that the slide lock mechanism 80 is held locked or lockable.

When the slide lock manual release lever 67 is depressed (i.e. slide lock manual release operation is effected) as shown by the phantom line in FIG. 8, the link arm 61 pivots counterclockwise, as shown in the figure, around the shaft 39, and the pivotal arm 65 pivots counterclockwise around the shaft 65a by movement of the connecting arm 64. By such pivotal movement of the pivotal arm 65, the other end 65b is displaced upward and the lock release pin 63 moves upward against the compression spring 66. When the lock release pin 63 moves upward and is further inserted into the lock hole 30a, the upper surface of the lock release pin 63 extends above the lock hole 30a. As a result, the lock pin 83 is pushed out of the lock hole 30a, so that the slide lock mechanism 80 is unlocked.

Further, when the slide lock manual release lever 67 is depressed as described above, the shaft 39 rotates and thus the rack 38 mounted to the shaft 39 pivots upward as shown by the phantom line in FIG. 8. As a result, the pinion gear 6 does not engage the rack 38 over the entire rotational range of the seat body 2. Thus, when the slide lock mechanism 80 is released (unlocked) by the slide lock manual release mechanism 60, the coupling of the rotational movement and the longitudinal movement of the seat body 2 is automatically released. Therefore, when the slide lock manual release mechanism 60 is operated (i.e. when the slide lock manual release lever 67 is depressed), the seat body 2 can only either rotate or move longitudinally.

Further, with the seat body 2 held in the position facing the front of the vehicle (without being rotated from the seated position), when the slide lock is released and the seat body 2 is moved to the front position within the longitudinal moving range and thereafter the slide lock manual release mechanism 60 is released to return the rack 38 to the original horizontal position, the projection 6a of the pinion gear 6 engages in a recess 38b formed in the rack 38 adjacent to the front end thereof, so that the seat body 2 is locked unmovable in the front position.

The most typical operation procedures for the rotating seat 1 thus constructed will now be described with reference to FIGS. 10(A) to 10(D). FIG. 10(A) shows the seat body 2 in the seated position. In these figures, the rearmost position and the front position in the longitudinal moving range of the seat body 2 are shown by L0 and L1, respectively, with reference to the center of the rotation of the seat body 2 (i.e. the center of the rotation of the rotating ring 11); and the interior side position and the exterior side position in the lateral moving range are shown by W0 and W1, respectively.

Figure 10:
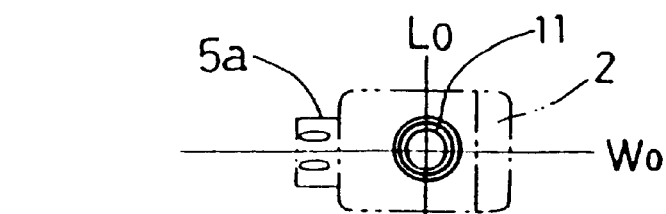
Figure 10:
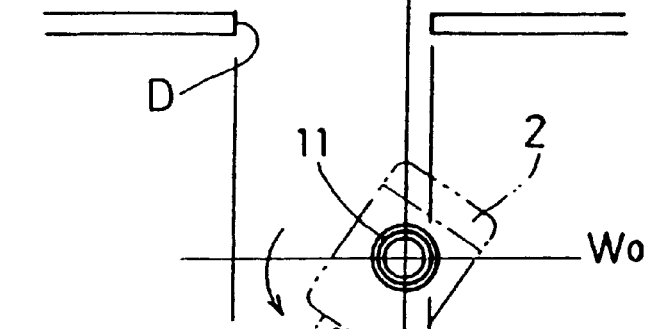
Figure 10:
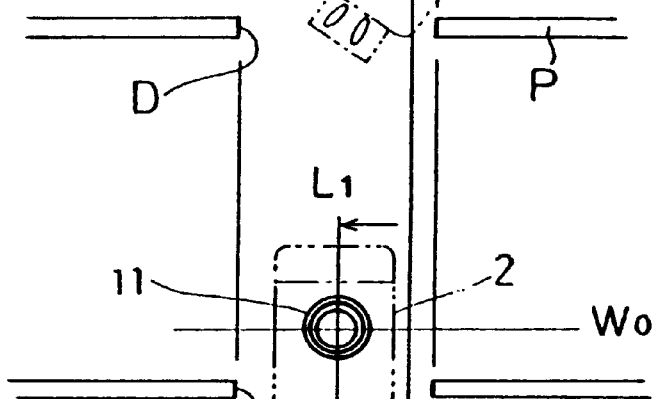
Figure 10:
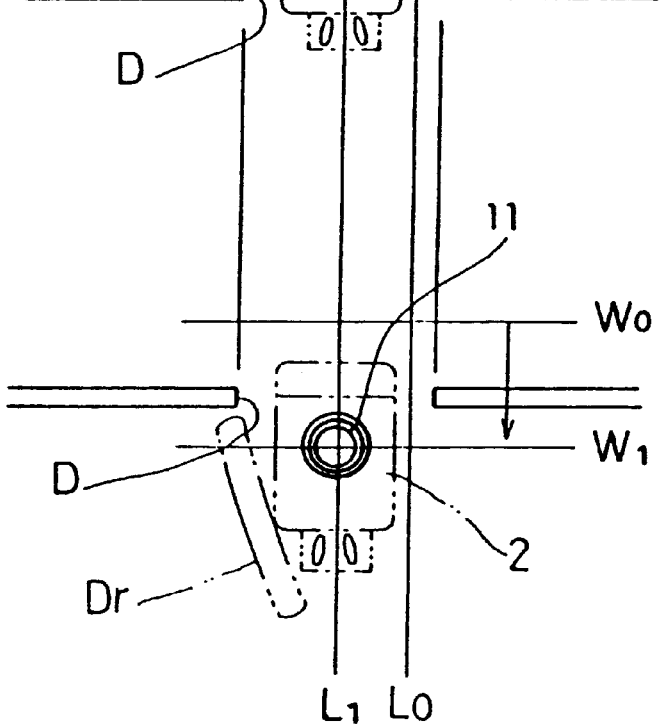

The rotation lock mechanism 70 is released in the seated position shown by FIG. 10(A), and the seat body 2 is rotated to the side of the door opening D (counterclockwise in FIG. 10). FIG. 10(B) shows the seat body 2 thus rotated about 40°. During this period, the pinion gear 6 and the rack 38 do not engage with each other, so that the seat body 2 only rotates. At this stage, the seat body 2 is brought to a position just before a seat cushion 2a of the seat body 2 interferes with the rear portion of the door opening D or a rear pillar P. Therefore, if the seat body 2 is further rotated as it is, the seat body 2 will interfere with the pillar P so that the seat body 2 cannot be rotated to the sideways position facing the door opening D.

When the seat body 2 is rotated by about 40°, however, the slide lock release plate 7 is moved to the roller 82 of the slide lock mechanism 80 and depresses the roller 82. Thus, the slide lock mechanism 80 is unlocked, so that the seat body 2 is allowed to move forward and at the same time, the pinion gear 6 and the rack 38 start to engage with each other.

Therefore, when the seat body 2 is further rotated thereafter, coupling with this rotational movement, the seat body 2 moves forward by engaging the pinion gear 6 with the rack 38. The seat body 2 thus moves forward while rotating the remaining about 50a. As a result, as shown in FIG. 10(C), the seat body 2 turns to the sideways position facing the side of the door opening D and moves to the front position L1. By the seat body 2 thus moving forward while rotating, the occupant's foot or the footrest 5a is prevented from interfering with the front end of the door opening D. In this respect, if the seat body is rotated after being moved to the front position like the prior art, the occupant's foot will interfere with the door opening (vehicle body).

When the seat body 2 turns to the sideways position, the lock member 74 is locked by the rotation lock plate 75 on the rear right side of the rotating support base 10, so that the seat body 2 is locked against rotation in the sideways position. The seat body 2 is also locked against longitudinal movement as being locked against rotation, because the pinion gear 6 and the rack 38 are in engagement with each other and thus the rotational movement and the longitudinal movement of the seat body 2 are coupled to each other.

Next, the electric motors 55 on the lateral support base 50 are rotated in the normal direction to move the seat body 2 from the interior side position W0 shown in FIG. 10(C) to the exterior side position W1 shown in FIG. 10(D) in which the occupant may leave the seat. In this process, the seat body 2 is gradually displaced to a lower level (for example, to the same level as the wheel chair) while moving to the exterior of the vehicle through the door opening D (see FIG. 11). If the occupant tries to move directly from the exterior side position W1 to the wheel chair, the occupant can easily move from the seat body 2 to the wheel chair.

Further, as shown in FIG. 10(D), even if, in the process in which the seat body 2 is moved to the exterior of the vehicle by operation of the lateral support base 50, the opened door Dr is subjected to the force of wind applied in a direction that would close the door, the door is held in the opened position by the seat cushion 2a of the seat body 2. Therefore, the door does not interfere with the occupant's entry/exit.

In order to return the seat body 2, which has thus been moved to the exterior side position W1, to the original seated position, the electric motors 55 are rotated in the reverse direction to move the lateral support base 50 in the backward direction. Thus, the seat body 2 is returned to the interior side position W0 shown in FIG. 10(C). Thereafter, the rotation lock mechanism 70 is released and the seat body 2 is manually rotated to the interior side. In this stage, the pinion gear 6 and the rack 38 are held in engagement with each other, and the seat body 2 moves from the front position L1 to the rearmost position L0 while rotating to the interior side.

When the seat body 2 is rotated by about 50° from the sideways position to the interior side, the seat body 2 is returned to the rearmost position L0 shown in FIG. 10(B). Thereafter, the seat body 2 is further rotated about 40° to be returned to the seated position shown in FIG. 10(A). In this rotational range of about 40°, the pinion gear 6 is disengaged from the rack 38 and the slide lock mechanism 80 is also disengaged from the roller 82. As a result, the slide lock mechanism 80 is returned to the locked state, so that the seat body 2 only rotates without moving in the longitudinal direction.

With the rotating vehicle seat 1 having the above construction according to this embodiment, the seat body 2 is supported by the rotating support base 10 and the longitudinal support base 30, and the pinion gear 6 and the rack 38 that serve as coupling means to engage with each other are disposed between the seat body 2 (the seat base 5) and the longitudinal support base 30. Therefore, the rotational movement and the longitudinal movement of the seat body 2 are coupled to each other. Thus, for example, even in the case of a sedan type car having a narrow door opening D, the seat body 2 can be turned to the door opening D and moved to the exterior without interfering with a pillar or other portions of the car and without the occupant's foot interfering with the edge of the door opening D.

Various changes or modifications may be added to the above-described embodiment. For example, in the above embodiment, only the lateral support base 50 is electrically driven, but the rotating support base 10 and the longitudinal support base 30 may also be electrically driven. Alternatively and to the contrary, the lateral support base 50 may be manually operated like the rotating support base 10 and the longitudinal support base 30.

Further, the coupling means that serves to couple the rotational movement and the longitudinal movement of the seat body 2 may have another construction, as shown in FIGS. 12 to 16. In the coupling means according to a second embodiment, an intermediate gear 110 is disposed between a pinion gear 100 and a rack 120. Components having the same construction as in the first embodiment will not be described and are identified by the same numerals.

Figure 12:
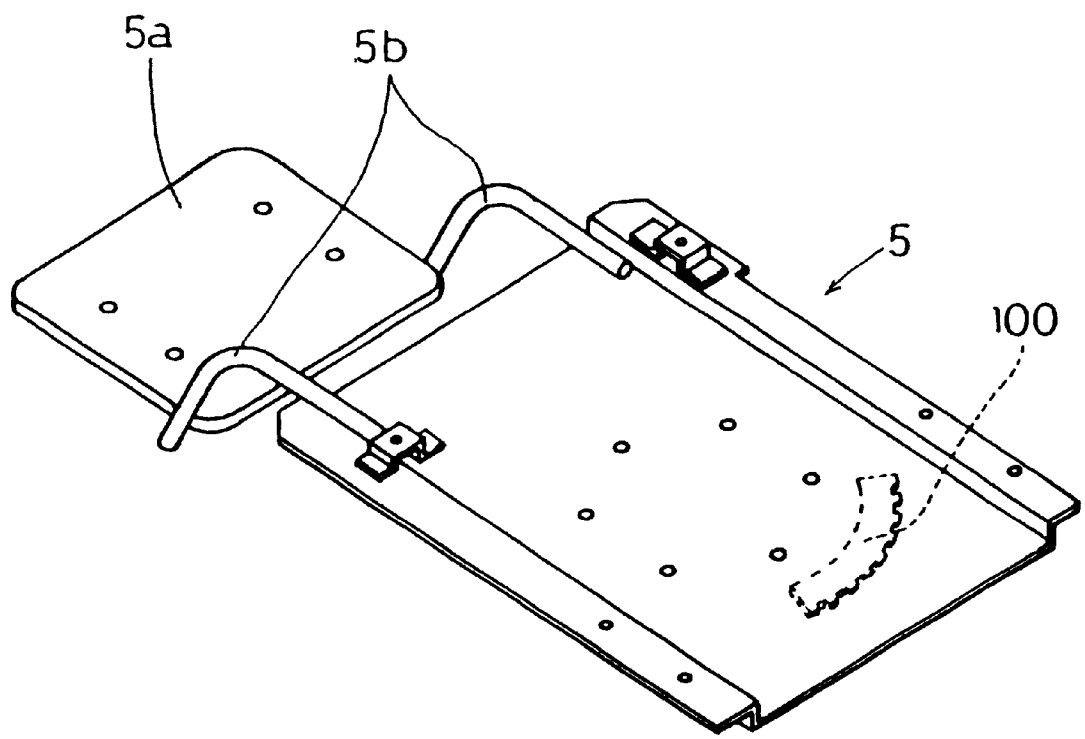
FIG. 12 is a perspective view of a seat base that is used as a coupling means for a second embodiment.
Figure 15:
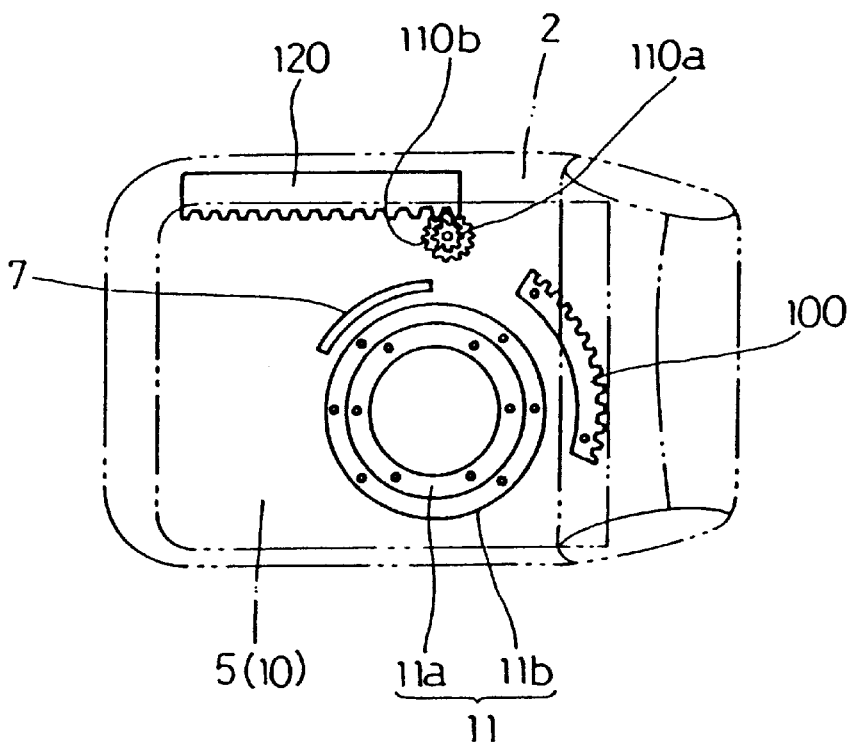
FIG. 15 is a plan view showing the positional relationship of a pinion gear, an intermediate gear and a rack used as the coupling means for the second embodiment.

As shown in FIGS. 12 and 15, the pinion gear 100 has a circular arc shape around the center of rotation of the seat body 2 (the center of rotation of the rotating ring 11) and is mounted on the underside of the seat base 5 at a location generally diametrically opposite to the pinion gear 6 in the first embodiment. The pinion gear 100 does not engage with a small gear portion 110a of the intermediate gear 110, which will be described below, within a predetermined rotation angular range (for example, about 40° similar to the first embodiment) at the beginning of the rotation of the seat body 2. Therefore, the seat body 2 only rotates without moving forward. In this point, the second embodiment is the same with the first embodiment.

Figure 13:
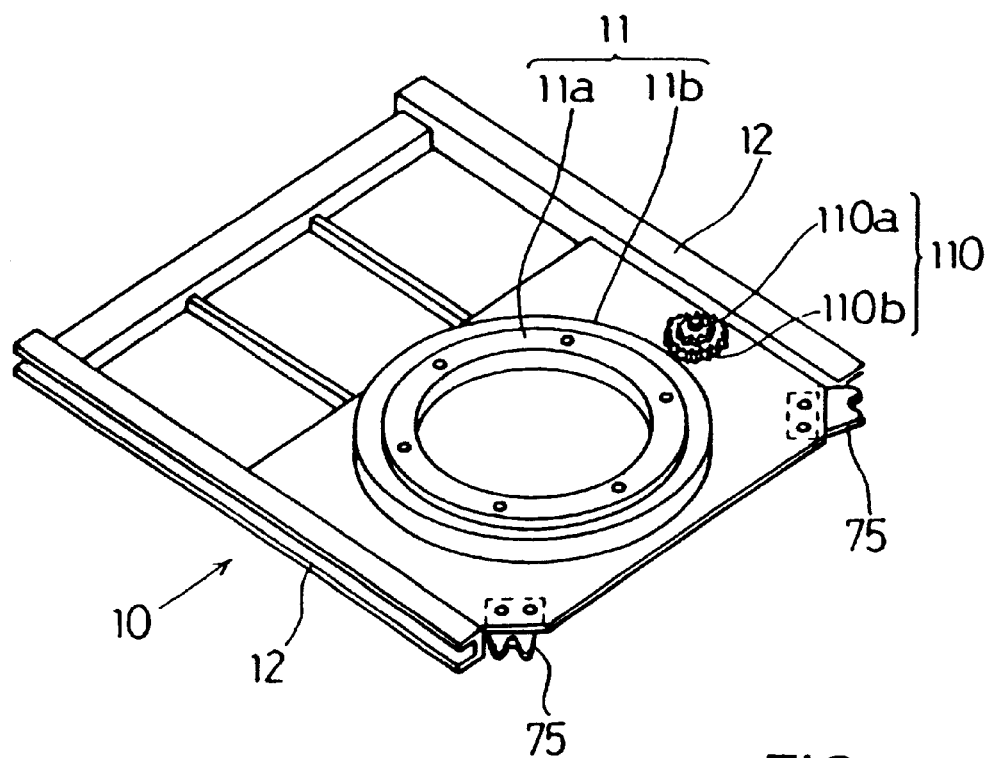
FIG. 13 is a perspective view of a rotating support base that is used as the coupling means for the second embodiment.
Figure 16:
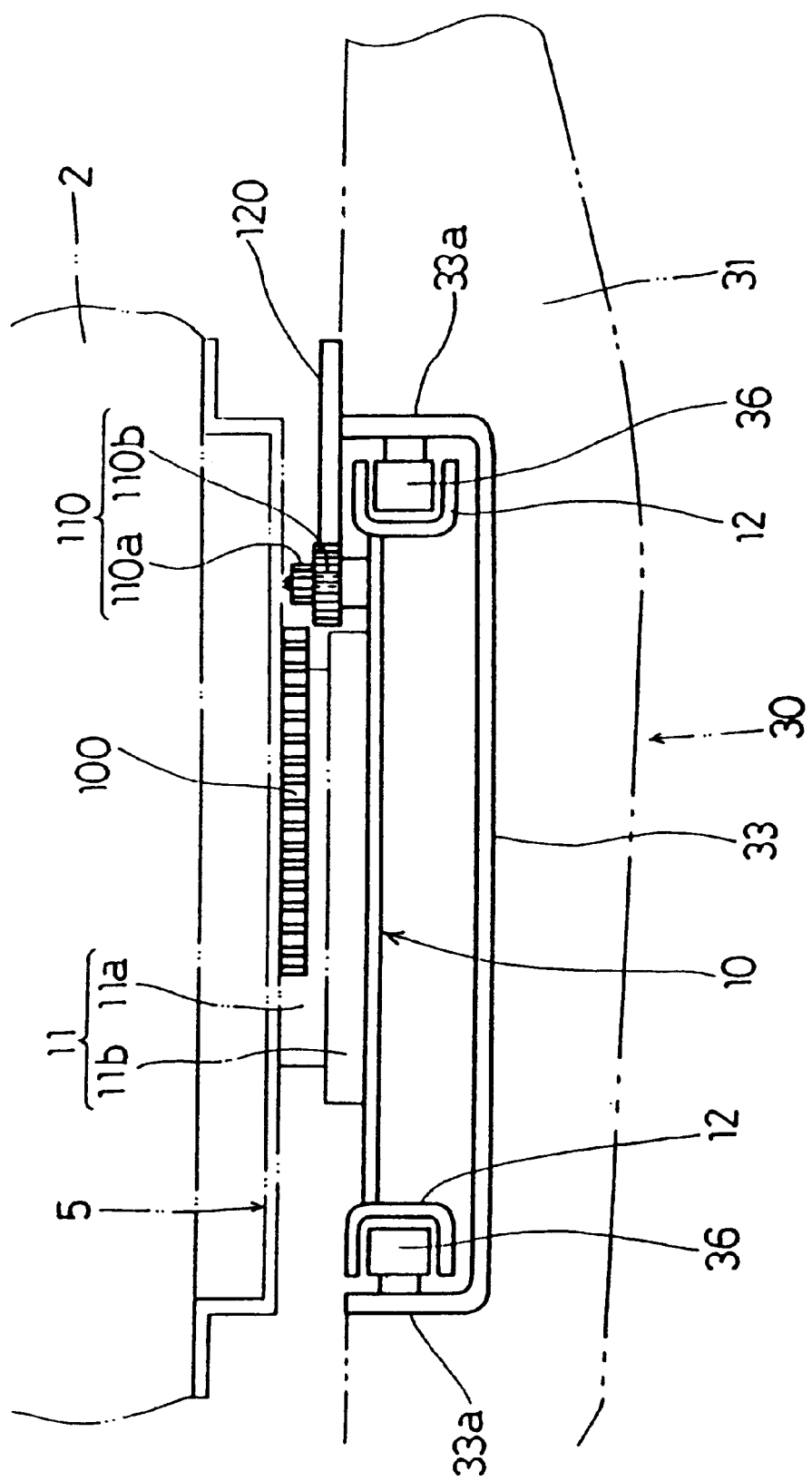
FIG. 16 is a side view showing the positional relationship of a pinion gear, an intermediate gear and a rack used as the coupling means for the second embodiment.

As shown in FIGS. 13, 15 and 16, the intermediate gear 110 is rotatably supported on the top surface of the rotating support base 10 and has a small gear portion 110a having a fewer number of teeth and a large gear portion 110b having a greater number of teeth. The small and large gear portions 110a and 110b rotate together and the gear ratio of the large gear portion 110b to the small gear portion 110a is set to be 2:1. The small gear portion 110a and the pinion gear 100 are positioned to engage with each other when the seat body 2 is rotated by about 40°.

Figure 14:
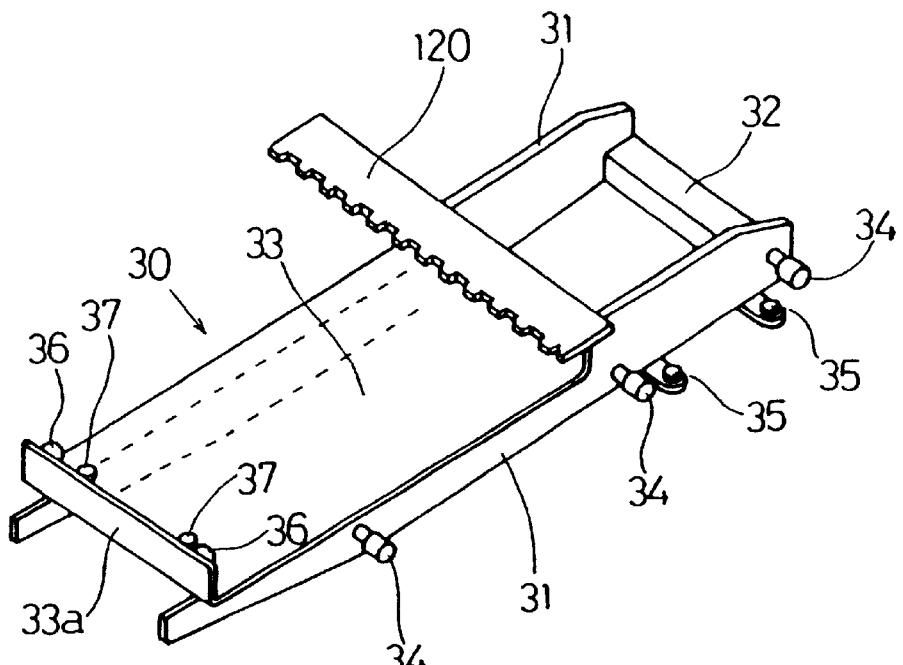
FIG. 14 is a perspective view of a longitudinal support base that is used as the coupling means for the second embodiment.

As shown in FIGS. 14 and 16, a rack 120 is mounted on the longitudinal support base 30 along the bent edge 33a on the interior side (the side opposite to the rack 38 of the first embodiment). The rack 120 is engaged with the large gear portion 110b of the intermediate gear 110 all the time.

With the coupling means thus constructed according to the second embodiment, when the rotation lock mechanism 70 is released and the seat body is rotated by about 40° to the door opening side, the pinion gear 100 engages with the small gear portion 110a. At this time, like the first embodiment, the slide lock mechanism 80 is released by the slide lock automatic release plate 7, which allows the seat body 2 to move forward. Therefore, when the seat body 2 is further rotated with the pinion gear 100 and the small gear portion 110a is held in engagement with each other, the small gear portion 110a and the large gear portion 110b rotate, and the seat body 2 moves forward while rotating by engaging the large gear portion 110b with the rack 120. Thus, with the coupling means of the second embodiment, the rotational movement and the longitudinal movement of the seat body are also coupled to each other. Therefore, the same effect as the first embodiment can be obtained.

Further, in the second embodiment, the intermediate gear 110 is disposed between the pinion gear and the rack 120, and the gear ratio of the small gear portion 110a to the large gear portion 110b of the intermediate gear 110 is set to be 1:2. Therefore, the length of movement of the seat body 2 in the longitudinal direction can be doubled compared with the first embodiment. Because the longitudinal moving distance can be set longer, the initial position (the position L0 in FIG. 10) of the rotating seat 1 can be set to a more rearward position in order to ensure a wider space at the occupant's feet. Therefore, the rotating seat 1 can be variously used not only with a passenger car but also with other types of vehicles, such as a van.

The gear ratio of the small gear portion 110a to the large gear portion 110b of the intermediate gear 110 may be changed so that the longitudinal moving distance of the seat body 2 can be set to a desired distance according to the type of vehicle. Further, similar to the first embodiment, the rack 120 may be vertically pivotable so that the manual release mechanism 60 for the longitudinal slide lock can be provided.

Figure 17:
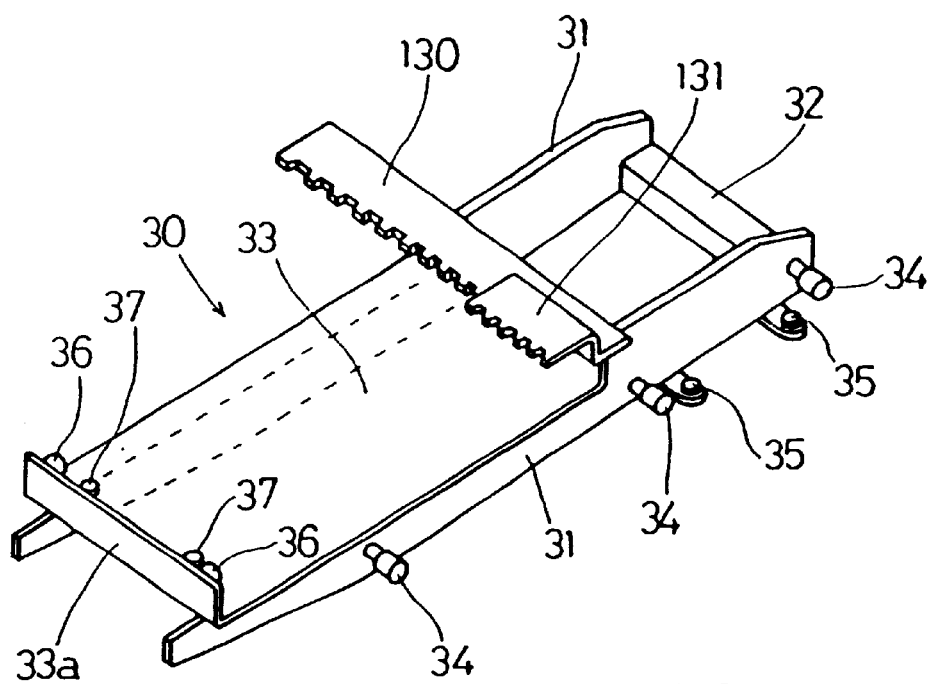
FIG. 17 is a perspective view of a seat base that is used as a coupling means of a third embodiment.
Figure 18:
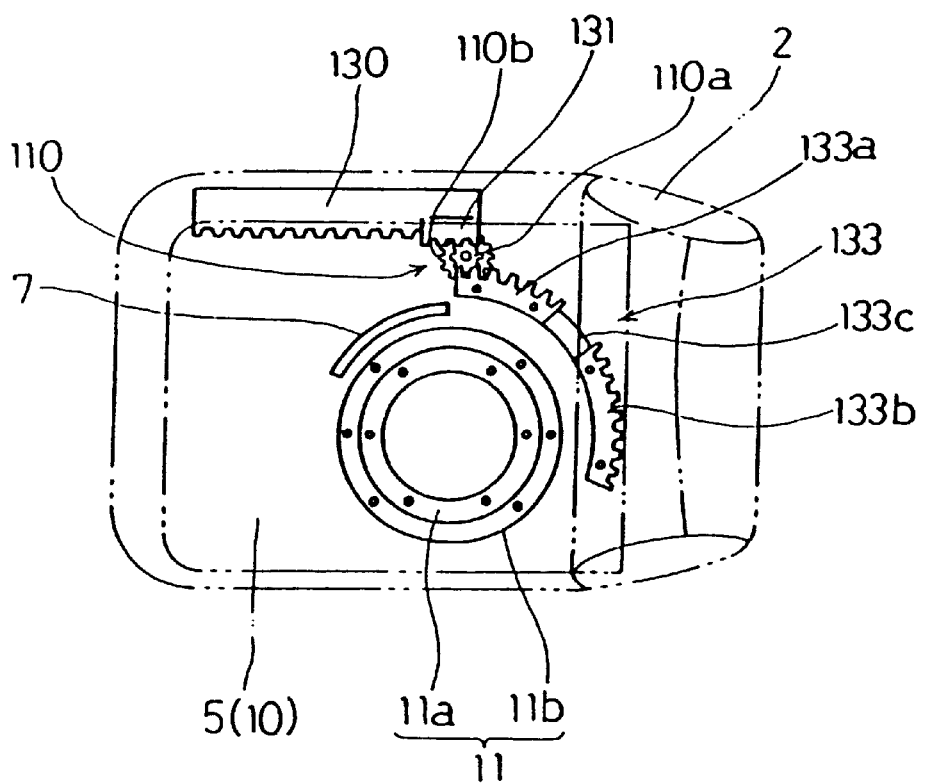
FIG. 18 is a plan view showing the positional relationship of a pinion gear, an intermediate gear and a rack used as the coupling means for the third embodiment.
Figure 19:
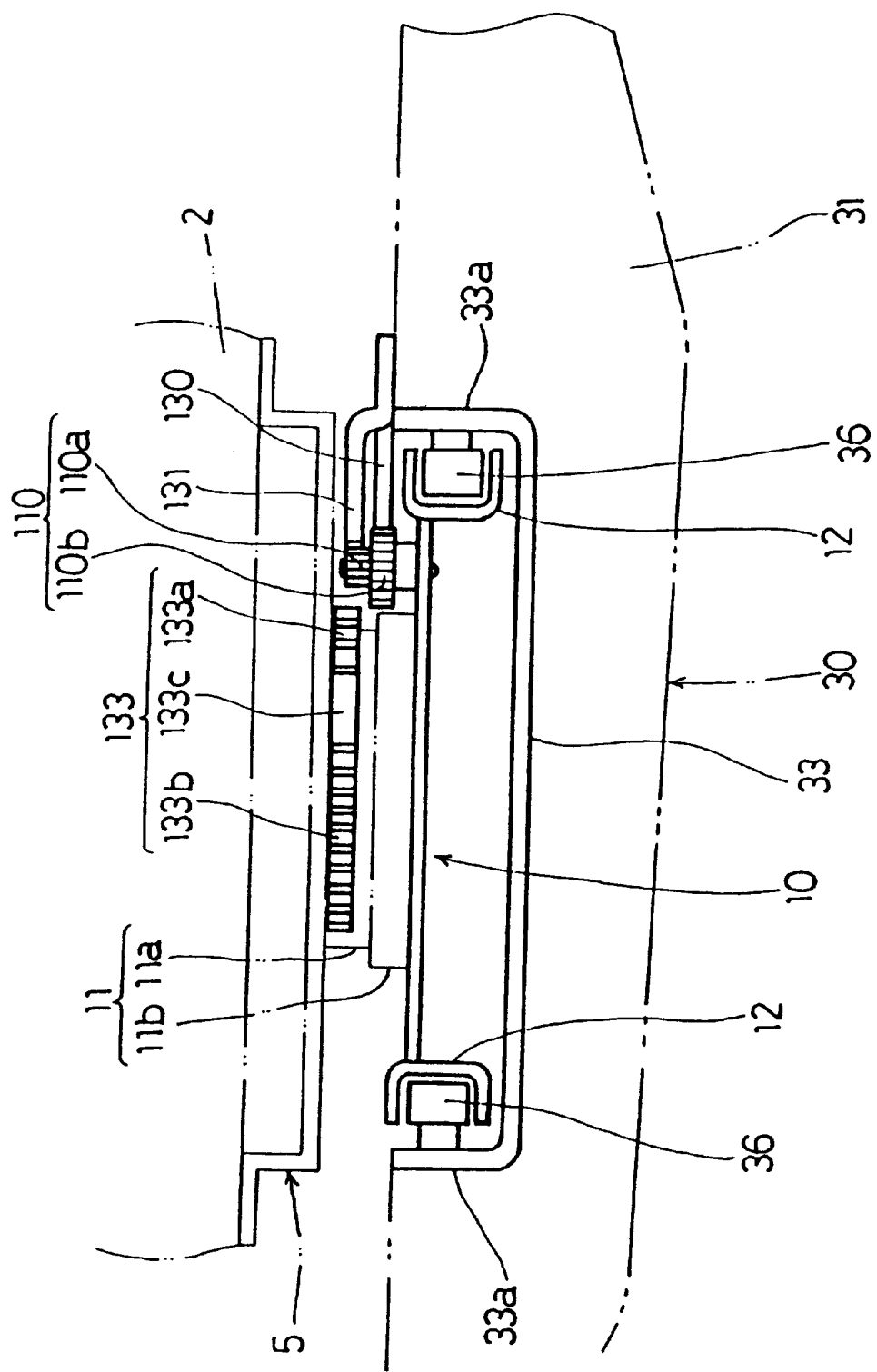
FIG. 19 is a side view showing the positional relationship of a pinion gear, an intermediate gear and a rack used as the coupling means for the third embodiment.

FIGS. 17 to 19 show a coupling means according to a third embodiment, which is a further modification of the second embodiment. Only modified points will now be described. As shown in FIG. 17, an auxiliary rack 131 is provided on the rear end of the rack 130 (the end on the near side in the figure) and is displaced upwardly from the rack 130. When the auxiliary rack 131 is in engagement with the small gear portion 110a, the rack 130 is not in engagement with the large gear portion 10b. As shown in FIG. 18, pinion gear 133 does not have any teeth within a predetermined range of a middle portion in the rotational direction thereof. A first gear portion 133a of the pinion gear 133 on the forward side in the rotational direction is engaged with the intermediate gear 110 from the beginning of rotation of the seat body 2.

With the coupling means thus constructed according to the third embodiment, upon rotating from the seated position to the door opening side, the seat body 2 simultaneously moves forward by engagement between the first gear portion 133a and the small gear portion 110a and by engagement between the small gear portion 110a and the auxiliary rack 131. In this first half of the coupling step (within the about 40° rotating range of the seat body 2), the large gear portion 110b of the intermediate gear 110 is not involved in the coupling action. Therefore, the rotational movement of the seat body 2 is not amplified, and the seat body 2 moves forward at substantially the same ratio (the ratio between the rotational angular distance and the forward moving distance of the seat body 2) as the coupling means of the first embodiment.

After the seat body 2 has been rotated by about 40°, the engagement between the first gear portion 133a and the small gear portion 110a is released and the first half of the coupling step is finished. At this time, the engagement between the small gear portion 110a and the auxiliary rack 131 is released and the large gear portion 110b begins to engage with the rack 130. Thereafter, however, within a predetermined rotational range of the seat body 2, the pinion gear 133 having the no-teeth portion 133c does not engage with the small gear portion 110a. Therefore, the seat body 2 only rotates without moving forward. In the rotation only step (i.e. in the "non-coupling range"), the foot rest 5a of the seat body 2 is moved to the exterior of the vehicle without interfering with the door opening edge (pillar).

With rotation of the seat body 2, the no-teeth portion 133c of the pinion gear 133 passes the small gear portion 110a. Then, a second gear portion 133b on the rearward side in the rotational direction thereof begins to engage the small gear portion 110a. Therefore, when the seat body 2 is further rotated to the door opening side, the seat body 2 moves forward by engagement between the second gear portion 133b and the small gear portion 110a and by engagement between the large gear portion 110b and the rack 130. In this second half of the coupling step, the rotational movement of the seat body 2 is amplified according to the gear ratio between the small gear portion 110a and the large gear portion 110b, so that the seat body 2 moves forward at about double the rate compared with the first half coupling step. In this point, the coupling means of the third embodiment is the same as the second embodiment.

Thus, with the coupling means according to the second and third embodiments, the intermediate gear 110 having the large gear portion 110b and the small gear portion 110a is disposed between the pinion gear 100 (133) and the rack 120 (130, 131). Therefore, the longitudinal movement of the seat body 2 is amplified with respect to its rotational movement, so that the longitudinal moving distance of the seat body 2 can be longer than its rotational angular distance. Further, with the construction in which the intermediate gear 110 is disposed within the space for the seat body 2, the above effect can be obtained without sacrificing vehicle interior space.

Figure 20:
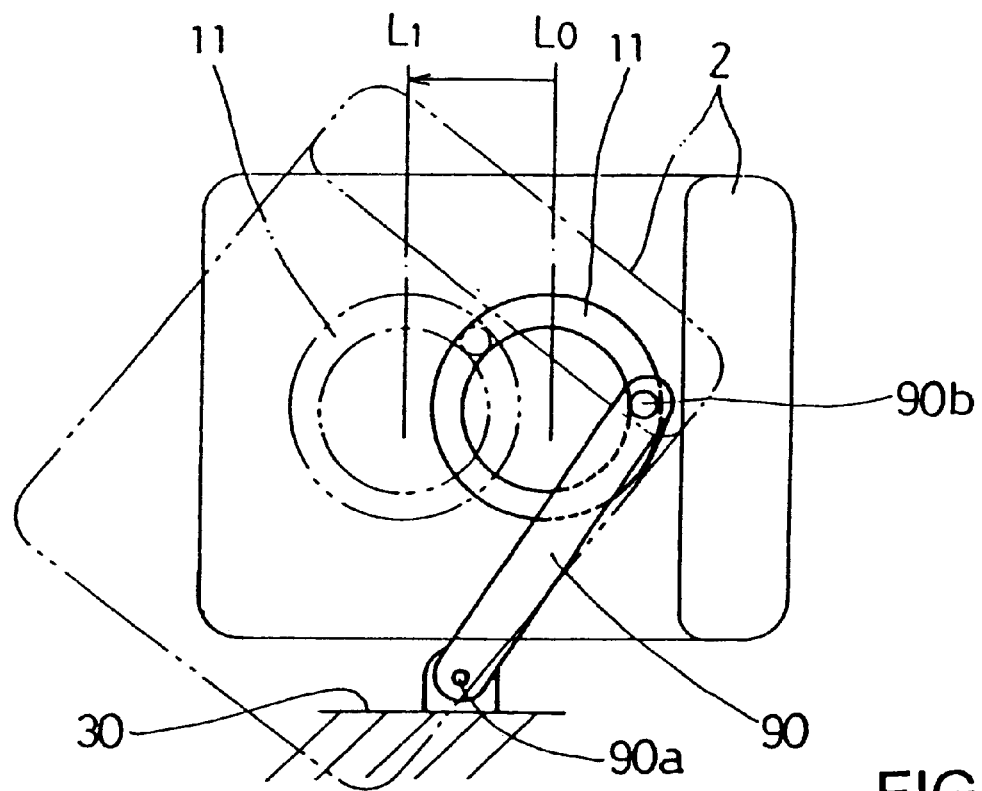
FIG. 20 is a plan view showing a fourth embodiment (of a link arm type) of the present invention.

The coupling means is not limited to the construction utilizing engagement between the pinion gear 6 (100, 133) and the rack 38 (120, 130, 131) like the first to third embodiments, but may also be obtained by other constructions. For example, FIG. 20 shows a construction of a fourth embodiment, in which the coupling action is performed by pivotal movement of a link arm 90. In the fourth embodiment, one end of the link arm 90 is rotatably connected to the longitudinal support base 30 via the shaft 90a at appropriate location and the other end is rotatably connected to the underside of the seat body 2 (the seat base 5) via the shaft 90b. No particular modifications are required for the other components.

With such a construction, when the seat body 2 is rotated, the shaft 90b moves along a circle around the center of rotation of the seat body 2 (the center of rotation of the ring 11) and thus the seat body 2 can be moved forward with respect to the longitudinal support base 30 by the moving distance of the shaft 90b in the longitudinal direction. In the link arm type coupling means, the movement of the seat body 2 in the longitudinal direction can also be coupled only in part of its rotational range, for example, by providing an elongated support hole for supporting the shaft 90b of the link arm 90.

Figure 21:
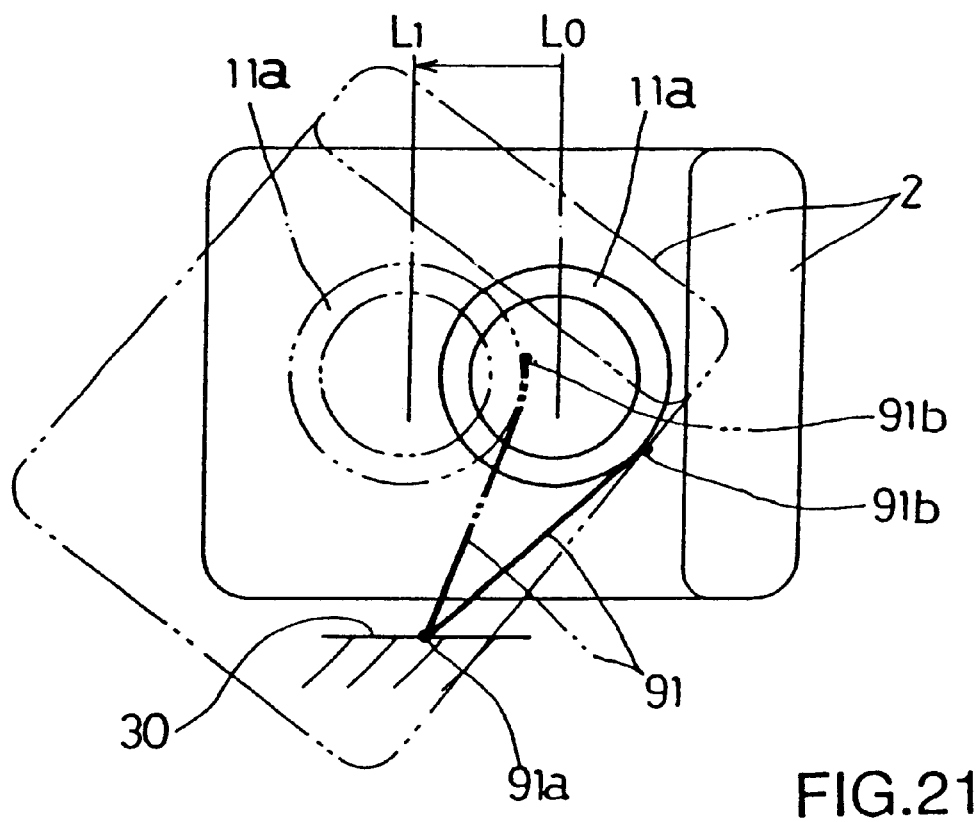
FIG. 21 is a plan view showing a fifth embodiment (of a wire type) of the present invention.

Further, a fifth embodiment is shown in FIG. 21, in which one end 91b of a wire 91, which serves as coupling means, is attached to an appropriate location of a peripheral surface of an inner ring 11a of the rotating ring 11 and the other end 91a is attached to the longitudinal support base 30. With this construction, when the seat body 1 is rotated, the inner ring 11a also rotates together, so that the wire 91 is wound around the inner ring 11a. The seat body 2 moves from the rearmost position L0 to the front position L1 by means of the wire 91 being wound and substantially shortened.

Figure 22:
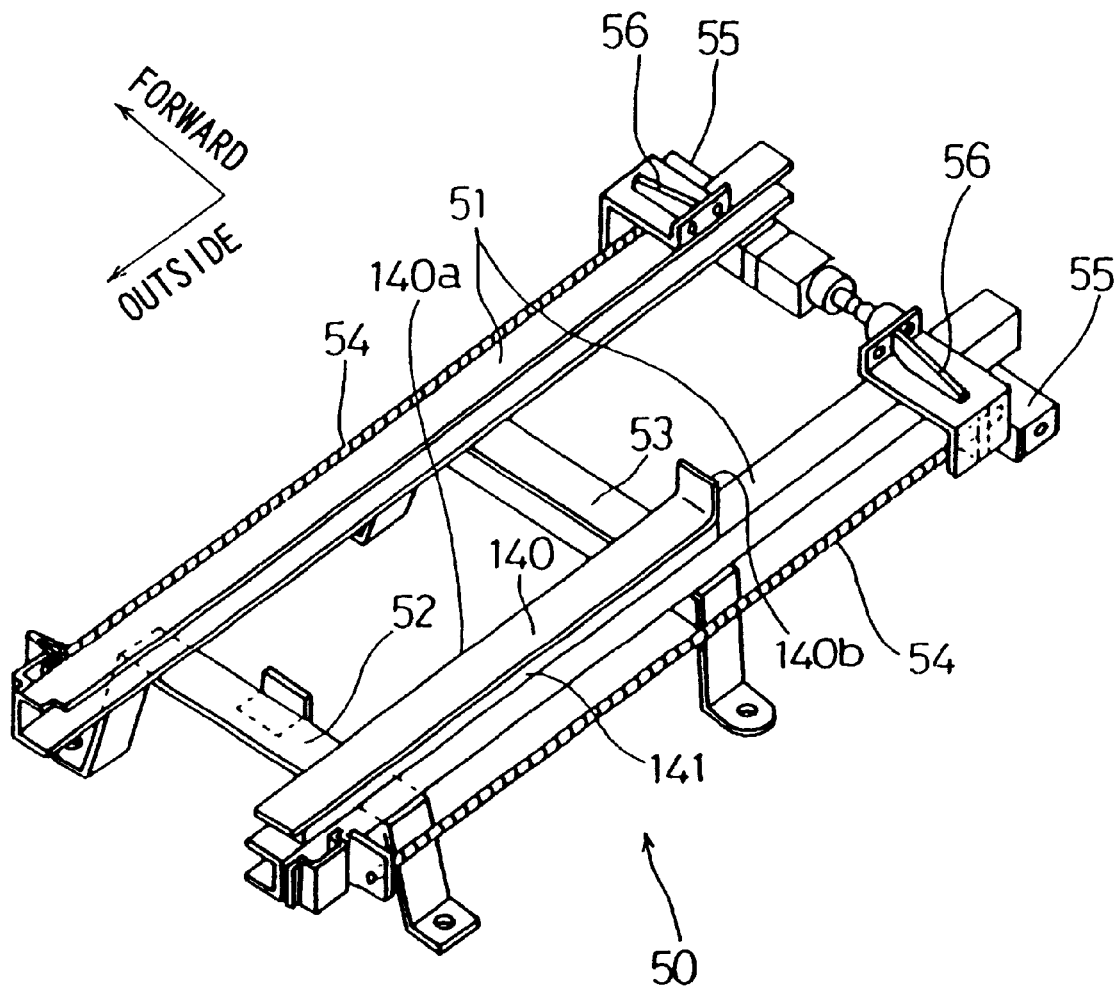
FIG. 22 is a perspective view of a lateral support base according to a sixth embodiment of the present invention.
Figure 23:
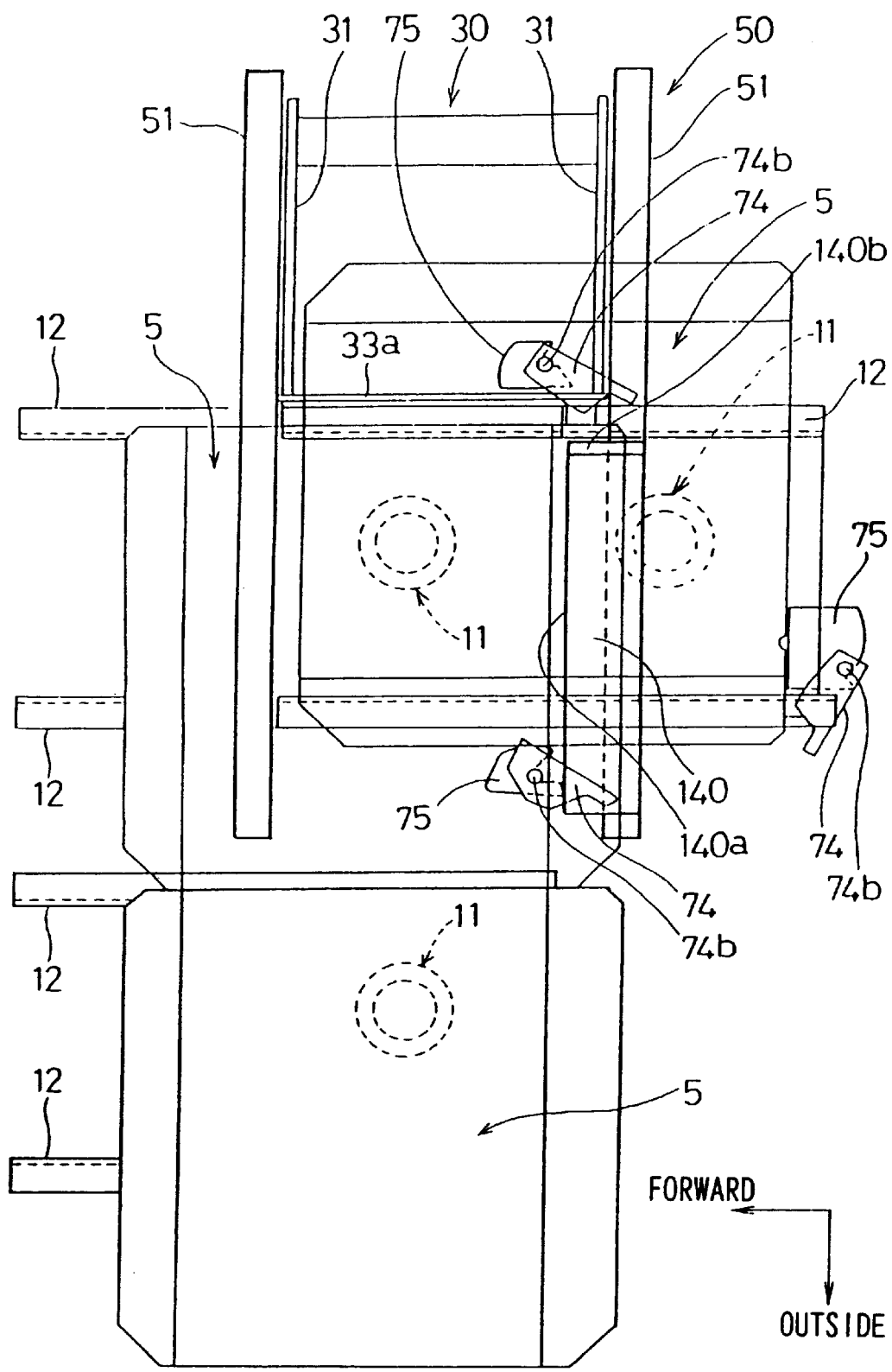
FIG. 23 is a plan view showing the positional relationship of the stopper plate with the seat base and the rotating support base in each operational position.
Figure 24:
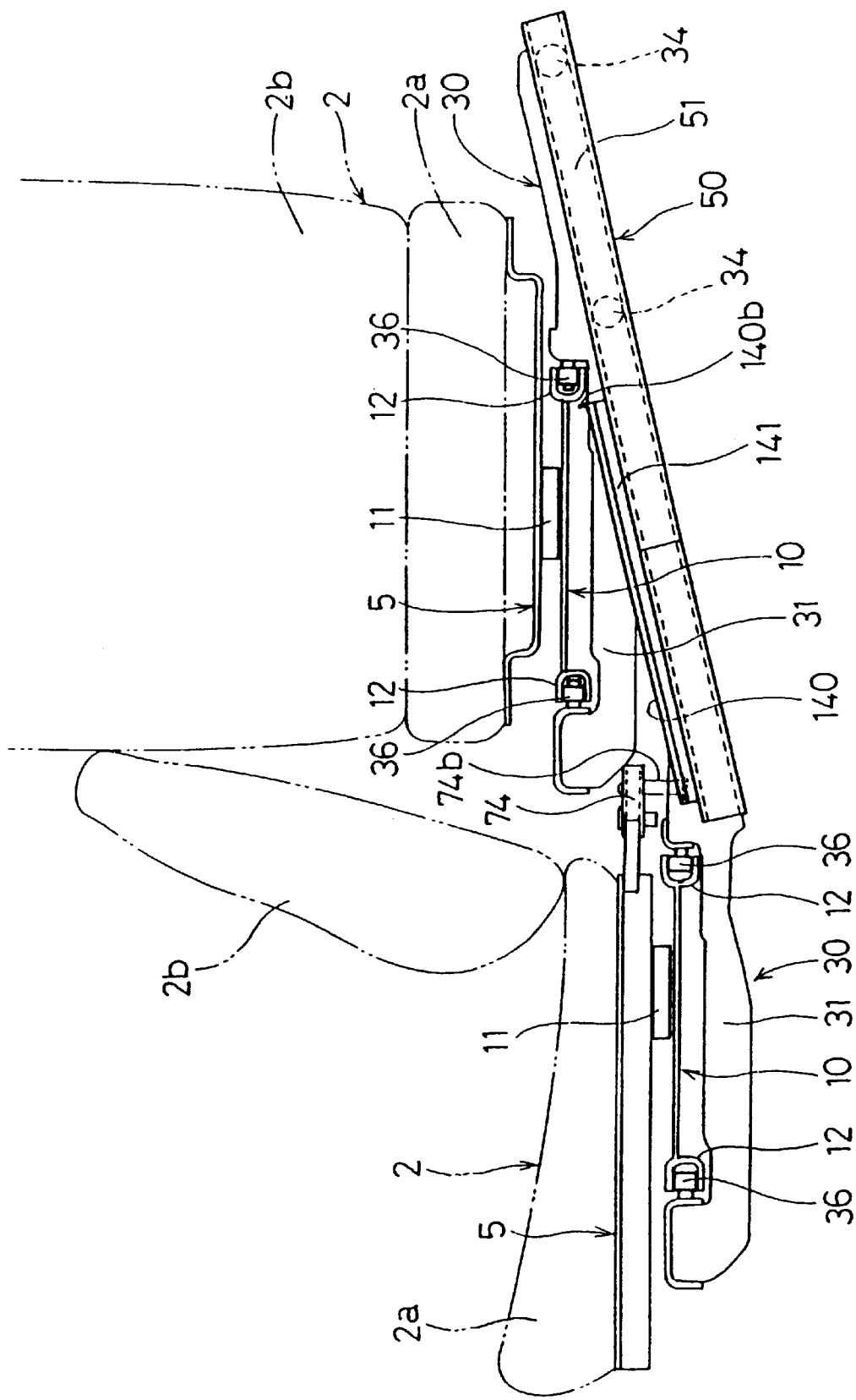
FIG. 24 is a side view showing the positional relationship of the stopper plate with the seat base, the rotating support base and the longitudinal support base in each operational position.

Finally, a sixth embodiment is shown in FIGS. 22 to 24, in which the lateral support base 50 further includes a stopper plate 140. No particular modifications are required for the other components. The stopper plate 140 is an example of a longitudinal restriction member described in claims 9 and 10. With this stopper plate 140, the seat body 2 is reliably restricted in its longitudinal movement and rotational movement during its lateral movement, and is also reliably restricted in its lateral movement in its seated position.

As shown in FIG. 22, the stopper plate 140 is mounted via the base 141 on the upper surface of the slide rail 51 on the rear side (the right side in the figure) of the lateral support base 50. As shown in the figure, the stopper plate 140 is about half the length of the slide rail 51 and is mounted on and along the slide rail 51 so as to extend from about the middle to substantially the exterior side end of the slide rail 51. The front side edge (the left side edge in the drawing) of the stopper plate 140 protrudes from the front side edge of the slide rail 51 by a predetermined amount and comprises a first stopper portion 140a. The interior side end of the stopper plate 140 is upwardly bent to be generally L-shaped and comprises a second stopper portion 140b.

The function of the stopper plate 140 will now be described. First, when the seat body 2 is in the seated position (shown in FIG. 10(A)), the rotating support base 10 is in the rearmost position and the seat base 5 is, like the seat body 2, in the seated position facing the front of the vehicle. In the seated position, the lock pin 74b of the lock member 74 mounted to the seat base 5 is engaged in the recess 75a of the rotation lock plate 75, so that the seat body 2 is locked against rotation.

With the seat body 2 in the seated position, the second stopper 140b of the stopper plate 140 is positioned adjacent to the exterior side of the interior side slide rail 12. The position of the second stopper portion 140b or the length of the stopper plate 140 is determined such that this condition can be realized. Therefore, the second stopper portion 140b stops the rotating support base 10 and thus the seat body 2 from moving toward the exterior side. Because the lateral movement of the seat body 2 in the seated position is thus stopped by the second stopper portion 140b, it is not necessary to provide the electric motor 55 of the lateral support base 50 that is, for example, of a brake incorporated type and to lock the lateral position by the incorporated brake. Therefore, the lateral position of the seat body 2 in the seated position can be reliably locked without the need for such a large motor installation space as in the case of using a brake incorporated electric motor and thus without increasing costs.

Next, when the rotation lock release lever 3 is unlocked to release rotation lock and the seat body 2 is rotated to the exterior side, the rotating support base 10 (and thus the seat body 2) moves forward while rotating by the action of engagement between the pinion gear 6 and the rack 38. When the seat body 2 is rotated to the sideways position and moved to the front position (as shown in FIG. 10(C)), the rear end of the interior side slide rail 12 of the rotating support base 10 moves forward (to the left in FIG. 23) of the second stopper portion 140b of the stopper plate 140 and slightly forward of the first stopper portion 140a of the stopper plate 140. Thus, lateral movement of the rotating support base 10 is allowed. At this time, the lock pin 74b is engaged with the recess 75a of the other rotation lock plate 75, so that the seat body 2 is locked in the sideways position against rotation.

By starting the electric motor 55 in this state, the seat body 2 can be moved to the exterior side. In this process of moving the seat body 2 to the exterior side, a small clearance is maintained between the rear end of the interior side slide rail 12 of the rotating support base 10 and the first stopper portion 140a of the stopper plate 140. Thus, the movement of the longitudinal support base 30 and also the seat body 2 to the exterior side is allowed. On the other hand, the longitudinal support base 30 is stopped from moving rearward by the first stopper portion 140a being positioned to the rear (to the right in FIG. 23) of the slide rails 12. As a result, the rearward movement of the seat body 2 is stopped and thus the rotational movement of the seat body 2 is also stopped.

The seat body 2 in the sideways position is, as described above, locked against rotation by engagement of the lockpin 74b and the lock plate 75, but such rotation lock can be released at any time, irrespective of the position of the seat body 2. Therefore, if the rotation lock release lever 73 is inadvertently released, the seat body 2 can rotate and is also allowed to move rearward by being coupled to the rotational movement. If the seat body 2 rotates or moves rearward while moving to the exterior side, the seat body 2 and the occupant will interfere with the pillar at the door opening, so that the seat body 2 cannot move smoothly to the exterior side. In this respect, by providing the stopper plate 140, the rearward movement and the rotational movement of the seat body 2 are stopped in the process of movement of the seat body 2 to the exterior side. Therefore, even if the rotation lock release lever 73 is inadvertently released, the seat body 2 can be moved straight to the exterior side without interference of the seat body 2 and the occupant with the pillar at the door opening.

Further, in the process of movement of the seat body 2 to the exterior side, as described above, the rear end of the slide rail 12 passes along the side of the first stopper portion 140a, so that the seat body is stopped from moving rearward. Further, the seat body 2 moves to the exterior side with the lock member 74 held engaged with the lock plate 75. Therefore, the lock pin 74b of the lock member 74 that passes along the side of the first stopper portion 140a also causes the seat body 2 to be stopped from moving rearward.

When the seat body 2 reaches the end position on the exterior side, the rear end of the exterior side slide rail 12 of the rotating support base 10 is disengaged from the side of the first stopper portion 140a. However, the lock pin 74b is still positioned to the side of the first stopper portion 140a, so that the seat body 2 is stopped from moving rearward and rotating in the end position as well.

Thus, by providing only one stopper plate 140 on the lateral support base 50, the seat body 2 in the seated position can be stopped from moving to the exterior side. Therefore, it is not necessary to use a brake incorporated electric motor as a drive source for the lateral support base 50, which needs a relatively large space and results in cost increase. This is particularly significant for the construction in which movement in the lateral direction is also manually operated (in which a drive motor is not provided). Further, because the seat body 2 is stopped from moving rearward and rotating in the process of movement of the seat body 2 to the exterior side or in the exterior position, even if the rotation lock release lever 73 is inadvertently released, the seat body 2 can be directed straight to the exterior side without interference of the seat body 2 and the occupant with the pillar at the door opening. Therefore, a rotating vehicle seat having improved usability can be provided.

In the sixth embodiment, the stopper plate 140 has been described as an example of having the function of restricting the lateral movement of the seat body 2 in the seated position and the function of restricting the longitudinal movement of the seat body 2 during its lateral movement; but it may have only one of the two functions as necessary.

Further, the longitudinal restriction member is not limited to the stopper plate 140 shown as an example in the embodiment; but it may be, for example, constructed as a wall is provided along the positions of the first and second stopper portions 140a and 140b or a wire having rigidity is provided across the positions of the stopper portions, or in other various forms.

What is claimed is:

1. A rotating vehicle seat, comprising a rotating support base for rotatably supporting a seat body, a longitudinal support base for supporting and moving the rotating support base in a longitudinal direction of a vehicle, and coupling means disposed between the seat body and the longitudinal support base for coupling the rotational movement and the longitudinal movement of the seat body.

2. The rotating vehicle seat as defined in claim 1, wherein the coupling means comprises a pinion gear that rotates together with the seat body, and a rack mounted on the longitudinal support base along the longitudinal direction thereof for engaging with the pinion gear.

3. The rotating vehicle seat as defined in claim 1, wherein the coupling means comprises a pinion gear that rotates together with the seat body, an intermediate gear rotatably mounted on the rotating support base, and a rack mounted on the longitudinal support base along the longitudinal direction thereof, the pinion gear engaging with a small gear portion of the intermediate gear and the rack engaging with a large gear portion of the intermediate gear, whereby the rotational movement of the seat body is amplified by a ratio corresponding to a gear ratio of the large gear portion to the small gear portion and is transmitted to the longitudinal movement of the seat body.

4. The rotating vehicle seat as defined in claim 2, wherein the pinion gear has a no-teeth portion so as to provide a range in which the longitudinal movement is not coupled to the rotational movement of the seat body within the total range of the rotational movement of the seat body.

5. The rotating vehicle seat as defined in claim 4, further comprising a slide lock mechanism for locking the longitudinal movement of the seat body, the slide lock mechanism being constructed to be automatically released when the rotational movement and the longitudinal movement of the seat body are coupled to each other.

6. The rotating vehicle seat as defined in claim 1, wherein the coupling means comprises a link arm of which one end is rotatably connected to the underside of the seat body at a position off center of the rotation of the seat body and the other end is rotatably connected to the longitudinal support base, whereby the one end of the link arm moves around the other end of the link arm and in the longitudinal direction of the vehicle as the seat body rotates, so that the seat body is moved in the longitudinal direction of the vehicle.

7. The rotating vehicle seat as defined in claim 1, wherein the coupling means comprises a wire of which one end is secured to the underside of the seat body and the other end is secured to the longitudinal support base, whereby the seat body is moved in the longitudinal direction of the vehicle by winding the wire as the seat body rotates.

8. The rotating vehicle seat as defined in claim 1, further comprising a lateral support base for moving the seat body in a lateral direction of the vehicle, the lateral support base being constructed to move the seat body to a lower position as the seat body moves to the exterior in the lateral direction of the vehicle.

9. The rotating vehicle seat as defined in claim 8, further comprising a longitudinal restriction member for restricting the longitudinal movement of the seat body during the lateral movement of the seat body.

10. The rotating vehicle seat as defined in claim 9, wherein the longitudinal restriction member also has a function of restricting the lateral movement of the seat body in the seated position.

11. The rotating vehicle seat as defined in claim 3, wherein the pinion gear has a no-teeth portion so as to provide a range in which the longitudinal movement is not coupled to the rotational movement of the seat body within the total range of the rotational movement of the seat body.

12. The rotating vehicle seat as defined in claim 11, further comprising a slide lock mechanism for locking the longitudinal movement of the seat body, the slide lock mechanism being constructed to be automatically released when the rotational movement and the longitudinal movement of the seat body are coupled to each other.

13. An apparatus comprising:
a seat body,
a first support base supporting the seat body, the first support base capable of rotation,
a second support base supporting the first support base, the second support base capable of moving the first support base in a longitudinal direction of a vehicle, and
means for coupling the rotational movement and the longitudinal movement of the seat body, the coupling means having a portion with gear teeth and a portion without gear teeth.

14. An apparatus as defined in claim 13, wherein the coupling means comprises a pinion gear that rotates together with the seat body, and a rack mounted on the first support base along the longitudinal direction thereof for engaging with the pinion gear.

15. An apparatus as defined in claim 14, wherein the pinion gear has a no-teeth portion so as to provide a range in which the longitudinal movement is not coupled to the rotational movement of the seat body within the total range of the rotational movement of the seat body.

16. An apparatus as defined in claim 15, further comprising a slide lock mechanism for locking the longitudinal movement of the seat body, the slide lock mechanism being constructed to be automatically released when the rotational movement and the longitudinal movement of the seat body are coupled to each other.

17. An apparatus as defined in claim 13, wherein the coupling means comprises a pinion gear that rotates together with the seat body, an intermediate gear rotatably mounted on the first support base, and a rack mounted on the second support base along the longitudinal direction thereof, the pinion gear engaging with a small gear portion of the intermediate gear and the rack engaging with a large gear portion of the intermediate gear, whereby the rotational movement of the seat body is amplified by a ratio corresponding to a gear ratio of the large gear portion to the small gear portion and is transmitted to the longitudinal movement of the seat body.

18. An apparatus as defined in claim 17, wherein the pinion gear has a no-teeth portion so as to provide a range in which the longitudinal movement is not coupled to the rotational movement of the seat body within the total range of the rotational movement of the seat body.

19. An apparatus as defined in claim 18, further comprising a aide lock mechanism for locking the longitudinal movement of the seat body, the slide lock mechanism being constructed to be automatically released when the rotational movement and the longitudinal movement of the seat body are coupled to each other.

20. An apparatus as defined in claim 13, wherein the coupling means comprises a link arm of which one end is rotatably connected to the underside of the seat body at a position off center of the rotation of the seat body and the other end is rotatably connected to the second support base, whereby the one end of the link arm moves around the other end of the link arm and in the longitudinal direction of the vehicle as the seat body rotates, so that the seat body is moved in the longitudinal direction of the vehicle.

21. An apparatus as defined in claim 13, wherein the coupling means comprises a wire of which one end is secured to the underside of the seat body and thee other end is secured to the second support base, whereby the seat body is moved in the longitudinal direction of the vehicle by winding the wire as the seat body rotates.

22. An apparatus as defined in claim 13, further comprising a third support base capable of moving the seat body in a lateral direction of the vehicle, the third support base being capable of moving the seat body to a lower position as the seat body moves to the exterior in the lateral direction of the vehicle.

23. An apparatus as defined in claim 22, further comprising a longitudinal restriction member capable of restricting the longitudinal movement of the seat body during the lateral movement of the seat body.

24. An apparatus as defined in claim 23, wherein the longitudinal restriction member is also capable of restricting the lateral movement of the seat body in the seated position.

25. A method for rotating a vehicle seat body supported by a rotating support base about a pivotal axis from a sitting position, in which the vehicle seat faces a front direction of a vehicle, to an entry/exit position, in which the vehicle seat faces a door opening, comprising:

rotating the vehicle seat body about the pivotal axis from the sitting position to an intermediate position without moving the vehicle seat body towards the front direction of the vehicle and simultaneously rotating the vehicle seat body about the pivotal axis and forwardly moving the vehicle seat body along a longitudinal support base towards the front direction of the vehicle from the intermediate position to the entry/exit position, wherein the forward movement is coupled to the rotational movement by coupling means disposed between the seat body and the longitudinal support base for coupling the rotational movement and the longitudinal movement of the seat body.

26. A method as in claim 25, wherein the vehicle seat body first rotates without moving forward and thereafter the vehicle seat body simultaneously rotates and moves forward.

27. A method as in claim 26, wherein an occupant is seated in the vehicle seat body during the rotation step and the intermediate position is a position in which the occupant's feet are within the door opening.

28. A method as in claim 26, wherein the vehicle seat body comprises a seat cushion and the intermediate position is a position just before the seat cushion will interfere with the door opening or a pillar of the vehicle.

29. A method as in claim 25, wherein the vehicle seat body is manually rotated and the manual rotation drives the forward movement for at least a portion of the rotational movement.

30. A method as in claim 25, further comprising operating a motor coupled to the vehicle seat body in order to drive the rotational and forward movement.

31. A method as in claim 25, further comprising moving the vehicle seat body in a lateral direction towards the door opening in order to assist an occupant's entry and exit of the vehicle seat body.

32. A method as in claim 25, further comprising moving the vehicle scat body in a lateral direction towards the door opening and simultaneously lowering the vehicle seat body in order to assist an occupant's entry and exit of the vehicle seat body.

33. A method as in claim 25, further comprising locking forward movement of the vehicle seat body while the vehicle seat body is rotating from the sitting position to the intermediate position.

34. A method as in claim 33, further comprising locking lateral movement of the vehicle seat body while the vehicle seat body is rotating from the sitting position to the entry/exit position.

35. A method as in claim 25, wherein the vehicle seat body comprises:

a pinion gear coupled to the vehicle seat body and arranged and constructed to rotate with the vehicle seat body, and a rack disposed along a longitudinal direction of the vehicle, wherein the rack is operatively coupled to the pinion gear and is arranged and constructed to move the vehicle seat body in the longitudinal direction of the vehicle while the vehicle seat body is rotating about the pivotal axis for at least a portion of the rotational range, and wherein:

the step of rotating the vehicle seat body about the pivotal axis from the sitting position to the intermediate position comprises rotating the pinion gear without engaging the rack; and the step of simultaneously rotating the vehicle seat body while moving the vehicle seat body forward towards the front direction of the vehicle from the intermediate position to the entry/exit position comprises rotating the pinion gear while engaging the rack.

36. A method as in claim 35, further comprising moving the vehicle seat body in a lateral direction towards the door opening in order to assist an occupant's entry and exit of the vehicle seat.

37. A method as in claim 35, further comprising moving the vehicle seat body in a lateral direction towards the door opening and simultaneously lowering the vehicle seat body in order to assist an occupant's entry and exit of the vehicle seat.

38. A method as in claim 35, further comprising locking forward movement of the vehicle seat body while the vehicle seat body is rotating from the sitting position to the intermediate position.

39. A method as in claim 38, further comprising locking lateral movement of the vehicle seat body while the vehicle seat is rotating from the sitting position to the entry/exit position.

40. A method as in claim 35, wherein the vehicle seat body further comprises an intermediate gear disposed between the pinion gear and the rack, wherein the intermediate gear engages the rack and the pinion gear during the step of simultaneously rotating the vehicle seat body while moving the vehicle seat body forward towards the front direction of the vehicle from the intermediate position to the entry/exit position.

41. A method as in claim 40, wherein an occupant is seated in the vehicle seat body during the rotation step and the intermediate position is a position in which the occupant's feet are within the door opening, the method further comprising:

locking forward movement of the vehicle seat body while the vehicle seat body is rotating from the sitting position to the intermediate position, locking lateral movement of the vehicle seat body while the vehicle seat body is rotating from the sitting position to the entry/exit position and after the vehicle seat body has been rotated to the entry/exit position, moving the vehicle seat body in a lateral direction towards the door opening and simultaneously lowering the vehicle seat body in order to assist an occupant's entry and exit of the vehicle seat body.

42. A rotating seat arranged and constructed for use in a vehicle comprising:

a seat body arranged and constructed to rotate about a pivotal axis, a first support base supporting the seat body and comprising a circular-arc pinion gear coupled to the seat body so as to rotate with the seat body, the pinion gear having a first portion with gear teeth and a second portion without gear teeth, a second support base comprising a rack disposed along a longitudinal direction of the vehicle, and means for coupling rotational movement and longitudinal movement of the seat body, wherein the pinion gear and the rack are ranged and constructed such that the rack is not operatively coupled to the pinion gear during rotation of the seat body from a sitting position to an intermediate position, whereby the seat body rotates without moving along the longitudinal direction of the vehicle, and the rack is operatively coupled to the pinion gear during rotation of the seat body from the intermediate position to an entry/exit position, whereby the seat body simultaneously rotates while moving forward along the longitudinal direction of the vehicle.

43. A vehicle seat as in claim 42, wherein the scat body further comprises a scat cushion and the intermediate position is sufficient to prevent the seat cushion from interfering with a door opening before moving the seat body forward in the longitudinal direction of the vehicle.

44. A vehicle seat as in claim 42, wherein the vehicle seat is arranged and constructed to rotate while moving forward only when the first portion of the pinion gear is operatively coupled to the rack.

45. A vehicle seat as in claim 44, further comprising an intermediate gear disposed between the pinion gear and the rack, wherein rotation of the pinion gear is coupled to the rack via the intermediate gear.

46. A vehicle seat as in claim 42, wherein the seat body further comprises an intermediate gear disposed on the first support base, the intermediate gear having a small gear portion and a large gear portion, wherein the pinion gear is operatively coupled to the small gear portion and the rack is operatively coupled to the large gear portion.

47. A vehicle seat as in claim 42, further comprising a rotating dug having a first ring and a second ring, wherein the first and second rings are concentrically disposed with a plurality of bearings disposed between the first ring and the second ring such that the first ring is adapted to rotate with respect to the second ring, wherein the first ring is coupled to the seat body end the second ring is coupled to the first support base.

48. A vehicle seat as in claim 47, wherein the first support base is coupled to the second support base and the first support base is arranged and constructed to move in the longitudinal direction while the seat body is rotating.

49. A vehicle seat as in claim 42, further comprising a lateral support base arranged and constructed to support movement of the seat body in a lateral direction of the vehicle.

50. A vehicle seat as in claim 49, wherein the lateral support base comprises downwardly inclined guide rails and the seat body moves to a lower vertical position when the seat body moves along the lateral direction.

51. A vehicle seat as in claim 42, further comprising a lock arranged and constructed to prevent the seat body from moving forward when the seat body rotates from the sifting position to the intermediate position.

52. A vehicle seat as in claim 42, further comprising a lock arranged and constructed to prevent the seat body from moving in a lateral direction of the vehicle when the seat body rotates from the sifting position to the entry/exit position.

53. A vehicle seat as in claim 42, further comprising:
a seat cushion coupled to the scat body, wherein the intermediate position is sufficient to prevent the seat cushion from interfering with a door opening before moving the seat body forward in the longitudinal direction of the vehicle,
a first lock arranged and constructed to prevent the seat body from moving forward when the seat body rotates from the sitting position to the intermediate position,
a second lock arranged and constructed to prevent the seat body from moving in a lateral direction of the vehicle when the seat body rotates from the sitting position to the entry/exit position,
an intermediate gear disposed between the pinion gear and the rack, wherein rotation of the pinion gear is coupled to the rack via the intermediate gear, the intermediate gear having a small gear portion and a large gear portion, wherein the pinion gear is operatively coupled to the small gear portion and the rack is operatively coupled to the large gear portion,
wherein the first support base is coupled to the second support base, wherein the vehicle seat support base is arranged and constructed to move in the longitudinal direction while the seat body is rotating,
a rotating ring having a first ring and a second ring, wherein the first and second rings are concentrically disposed with a plurality of bearings disposed between the first and second ring such that the first ring is adapted to rotate with respect to the second ring, wherein the first ring is coupled to the seat body and the second ring is coupled to the first support base, and
a lateral support base arranged and constructed to support movement of the seat body in a lateral direction of the vehicle, wherein the lateral support base comprises downwardly inclined guide rails and the seat body moves to a lower vertical position when the seat body moves along the lateral direction.

54. A vehicle seat as in claim 53, wherein the vehicle seat is arranged and constructed rotate while moving forward only when the first portion of the pinion gear is operatively coupled to the rack.

55. An apparatus comprising:
a vehicle seat body normally positioned in a sitting position that faces a forward portion of a vehicle,
a vehicle seat support base,
a rotary ring coupling the vehicle seat body to the vehicle seat support base, wherein the rotary ring is arranged and constructed to permit the vehicle seat body to rotate through a rotational range of approximately 90° with respect to the vehicle seat support base,
a longitudinal support base disposed in a substantially parallel relationship along a longitudinal direction of the vehicle, wherein the longitudinal support base is operatively coupled to the vehicle seat support base to permit the vehicle seat body to forwardly move in the longitudinal direction of the vehicle, and
means for rotating the vehicle scat from the sitting position to an intermediate position and for rotating the vehicle seat body while forwardly moving the vehicle seat body along the longitudinal direction of the vehicle from die intermediate position to a vehicle entry/exit position, said rotating means including a first portion with gear teeth and a second portion without gear teeth.

56. An apparatus as in claim 55, further comprising a lateral support base disposed along a lateral direction of the vehicle and operatively coupled to the vehicle seat support base, wherein the lateral support base supports movement of the vehicle seat support base in the lateral direction of the vehicle to assist an occupant's entry and exit of the vehicle seat body.

57. An apparatus as in claim 56, wherein the lateral support base is downwardly inclined so that the vehicle seat body will simultaneously lower in a vertical direction while moving in the lateral direction.

58. An apparatus as in claim 55, wherein the vehicle seat body further comprises a seat cushion and the intermediate position is sufficient to prevent the seat cushion from interfering with a door opening before moving the vehicle seat body forward in the longitudinal direction of the vehicle.

59. An apparatus as in claim 55, wherein the rotating means comprises a pinion gear and a rack, wherein the rotating means first portion and the rotating means second portion are disposed on to pinion gear, wherein the vehicle seat is arranged and constructed rotate while moving forward only when the rotating means first portion is operatively coupled to the rack.

60. An apparatus as in claim 59, wherein the rotating means further comprises an intermediate gear disposed between the pinion gear and the rack, wherein rotation of the pinion gear is coupled to the rack via the intermediate gear.

61. An apparatus as in claim 60, wherein the intermediate gear is disposed on the vehicle seat support base, the intermediate gear has a small gear portion and a large gear portion, the pinion gear is operatively coupled to the small gear portion and the rack is operatively coupled to the large gear portion.

62. An apparatus as in claim 55, further comprising a lock arranged and constructed to prevent the vehicle seat body from moving forward in the longitudinal direction of the vehicle when the vehicle seat body rotates from the sifting position to the intermediate position.

63. An apparatus as in claim 55, further comprising a lock ranged and constructed to prevent the vehicle seat body from moving in a lateral direction of the vehicle when the vehicle seat body rotates from the sitting position to the entry/exit position.

* * * * *